United States Patent
Jeffery et al.

(10) Patent No.: US 9,103,061 B2
(45) Date of Patent: *Aug. 11, 2015

(54) PRODUCT SERVICE SYSTEM AND METHOD

(75) Inventors: Randell L. Jeffery, Stevensville, MI (US); Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 1543 days.

This patent is subject to a terminal disclaimer.

(21) Appl. No.: 12/206,766

(22) Filed: Sep. 9, 2008

(65) Prior Publication Data

US 2009/0006970 A1    Jan. 1, 2009

Related U.S. Application Data

(63) Continuation-in-part of application No. 11/931,170, filed on Oct. 31, 2007, now Pat. No. 8,688,530, which is a continuation-in-part of application No. 11/617,793, filed on Dec. 29, 2006, now abandoned, which is a continuation-in-part of application No. PCT/US2006/022503, filed on Jun. 9, 2006, and a continuation-in-part of application No. PCT/US2006/022420, filed on Jun. 8, 2006.

(51) Int. Cl.
*G06Q 10/00* (2012.01)
*D06F 33/02* (2006.01)
*D06F 58/28* (2006.01)
*G06Q 30/02* (2012.01)

(52) U.S. Cl.
CPC ............. *D06F 33/02* (2013.01); *D06F 58/28* (2013.01); *G06Q 30/02* (2013.01); *D06F 2210/00* (2013.01)

(58) Field of Classification Search
USPC .................... 705/1.1, 302, 304, 305, 346, 500
See application file for complete search history.

(56) References Cited

U.S. PATENT DOCUMENTS

| | | | |
|---|---|---|---|
| 2001/0025349 A1 | 9/2001 | Sharood et al. | |
| 2001/0025392 A1 * | 10/2001 | Youn et al. | 8/159 |
| 2001/0049846 A1 * | 12/2001 | Guzzi et al. | 8/158 |
| 2004/0109548 A1 * | 6/2004 | Ito et al. | 379/102.03 |
| 2005/0143129 A1 | 6/2005 | Funk et al. | |
| 2005/0162273 A1 * | 7/2005 | Yoon et al. | 340/539.14 |
| 2006/0009861 A1 | 1/2006 | Bonasia et al. | |
| 2006/0123807 A1 | 6/2006 | Sullivan et al. | |
| 2006/0190266 A1 | 8/2006 | Tanigawa et al. | |
| 2006/0200550 A1 * | 9/2006 | Nelson et al. | 709/224 |
| 2007/0160022 A1 | 7/2007 | McCoy et al. | |

(Continued)

FOREIGN PATENT DOCUMENTS

| | | | | |
|---|---|---|---|---|
| JP | H11-146991 | * | 2/1999 | D06F 33/02 |
| WO | 03031876 A1 | | 4/2003 | |

(Continued)

OTHER PUBLICATIONS http://www.gizmag.com/go/1132/ from the way back machine, Mar. 2005, 1 page.*
European Search Report for Application No. EP08843374.3, dated May 27, 2014.
European Search Report for Application No. EP08845484.8, dated May 26, 2014.

(Continued)

*Primary Examiner* — Kira Nguyen

(57) ABSTRACT

An appliance is configured to establish a communications link through the appliance between a user and a service representative as part of installing, diagnosing and servicing the appliance.

14 Claims, 19 Drawing Sheets

(56) References Cited

U.S. PATENT DOCUMENTS

2007/0168457 A1* 7/2007 Huerta et al. ............... 709/217
2007/0240173 A1 10/2007 McCoy et al.

FOREIGN PATENT DOCUMENTS

WO 2006096854 A2 9/2006
WO 2006135758 A1 12/2006

OTHER PUBLICATIONS

European Search Report for Application No. EP08844798.2, dated May 26, 2014.
European Search Report for Application No. EP08845255.2, dated Jun. 6, 2014.
European Search Report for Application No. EP08844661.2, dated Jun. 6, 2014.

* cited by examiner

PRODUCT SERVICE SYSTEM AND METHOD

CROSS-REFERENCE TO RELATED APPLICATION

This application is a continuation-in-part of U.S. application Ser. No. 11/931,170, filed Oct. 31, 2007, which is a continuation-in-part of U.S. application Ser. No. 11/617,793 filed Dec. 29, 2006, which is a continuation-in-part of International Patent Application No. PCT/US2006/022420, filed Jun. 8, 2006, and International Patent Application No. PCT/US2006/022503, filed Jun. 9, 2006.

BACKGROUND OF THE INVENTION

Field of the Invention

The invention relates to servicing of products after purchase, and more particularly to systems and methods to effect remote diagnosis and servicing of products.

SUMMARY OF THE INVENTION

In accord with the invention, a method of servicing an appliance includes identifying an appliance configured to perform a useful cycle of operation to complete a physical operation on an article comprising one or more components operated by a microprocessor controller to run a cycle of operation, and also having a multimedia user interface. Servicing can be facilitated by establishing a video conference over the multimedia user interface between a service representative and a user to enable interaction between the service representative and the user. Simultaneously, a diagnostic routine related to one or more of the components can be run. The method can include establishing a data link with the appliance and collecting data about one or more of the components.

The video conference can include a still picture of the service representative, a video of a service representative, a voice signal from the service representative, a voice signal from the user, a still picture of the user, a video of a user, an audible signal from the appliance, a still picture of the appliance, or a video of the appliance. The interaction can include answering questions, asking questions, explaining to the user how to use the appliance, assisting the user in the service process, assisting the user in the installation or configuration of the appliance, ordering a replacement part, authorizing a replacement part order, purchasing a good or service, and authorizing the purchase of a good or service.

Preferably, the service representative controls the appliance by interacting with microprocessor, and can control it by sending a network message to the appliance, or a test script to be run on the appliance. In the latter case, the test script can be contained in an XML document, a database record, or SQL statements for appending and updating records in a database. The appliance will typically have multiple components and the service representative can select which of the multiple components to activate as part of the service. The service representative can send information to the user over the multimedia user interface, including such things as a fault tree, a how-to video, a use and care guide, a frequently ask questions document, a still picture, an image, a survey, a question, an SQL statement, an XML document, and a url. As well, the service representative can add another user to the video conference.

In another aspect of the invention, the method includes identifying a first appliance configured to perform a useful cycle of operation to complete a physical operation on an article, the first appliance having a multimedia interface, identifying a second appliance of similar configuration, and establishing a video conference connection between the first and second appliances such that a person at the first appliance can video conference with a person at the second appliance. The first and second appliances can be connected over a communications network or connected in a peer-to-peer relationship.

In another aspect of the invention, the method includes identifying an appliance having one or more components coupled to and controlled by a controller to implement a cycle of operation, with an internal communication network coupling the components to the controller, coupling a smart device having video conferencing functionality to the internal communication network where the smart device has software capable of assuming control of the a component; and establishing a video conference over the smart device to enable interaction between a service representative and a user. Either the service representative or the user can control the appliance using the smart device.

The appliance will typically have multiple components and the service representative can select which of the multiple components to activate. The smart device can be used for the service representative sending information to the user, the user sending information to the service representative, the appliance sending information to the service representative, or the appliance receiving information from the service representative. Preferably, the appliance is configured to perform a useful cycle of operation to complete a physical domestic operation on an article.

In yet another aspect, the invention includes a method of alerting a user of a need for maintenance of an appliance. Here the method includes identifying an appliance configured to perform a useful cycle of operation to complete a physical operation on an article, with one or more components operated by a microprocessor controller to run a cycle of operation, and also having a multimedia user interface. The method further includes ascertaining a need for maintenance of the appliance, establishing a data link with the multimedia user interface; and transmitting a message about the maintenance for receipt by a user. The ascertaining step can be based on a predetermined schedule, sensor data, diagnosis, or user input. Preferably, the data link is a video link and the message is a video message. The message can also be an audio message.

The method can also include the step of rendering the message on the multimedia user interface for receipt by a user. In this case, the rendering is preferably a visual message on a video screen or an audio message from a speaker.

In a further aspect of the invention, a method of servicing an appliance includes identifying an appliance configured as above and interacting with the multimedia user interface in an audiovisual conference link. Here, the interacting step can include leaving a video message, leaving an audio message, speaking to a user, seeing an image of the user, listening to the voice of a user, transmittal of an identifier identifying the interacting, receiving of warranty information, and receiving one of customer information, payment information, and/or product registration information.

An appliance according to the invention will one configured for performing a useful cycle of operation on a physical article and include one or more components whose actuation is used to implement a useful cycle of operation on a physical article, a controller to control operation of the components in the cycle of operation, a multimedia user interface, a communication portal, and a software component configured to communicate audio. With an appliance thus configured, a user and a third party can interact remotely by audio using the multimedia user interface or the communication portal to attend to one of the components or the controller. Preferably, the audio comprises voice over internet protocol. If using the multimedia user interface, it can be further configured to graphically interact with a user or a service representative. Such interaction can include displaying screens with one of questions about service, and questions about the operation of the appliance, and questions about performing tests during the service process, and/or questions about the appliance. Preferably, the appliance is configured to accept, store, and use new service information for the servicing of the appliance by a user, a service representative, or both.

The invention also contemplates an accessory for an appliance having one or more components configured to perform a useful cycle of operation on a physical article. The accessory includes a smart device enabled to communicate with the at least one component, and with a multimedia user interface, and a software component configured to communicate audio. When the smart device is coupled to an appliance, a user and a third party can interact remotely by audio using the multimedia user interface to attend to the appliance.

In another aspect of the invention, a network comprises two or more connected appliances. One of the appliances is configured to perform a useful cycle of operation on a physical article and both of the appliances are configured to communicate with each other. The network includes an audio communication link so that users at each appliance can interact remotely by audio using the network.

DETAILED DESCRIPTION

Figure 1:
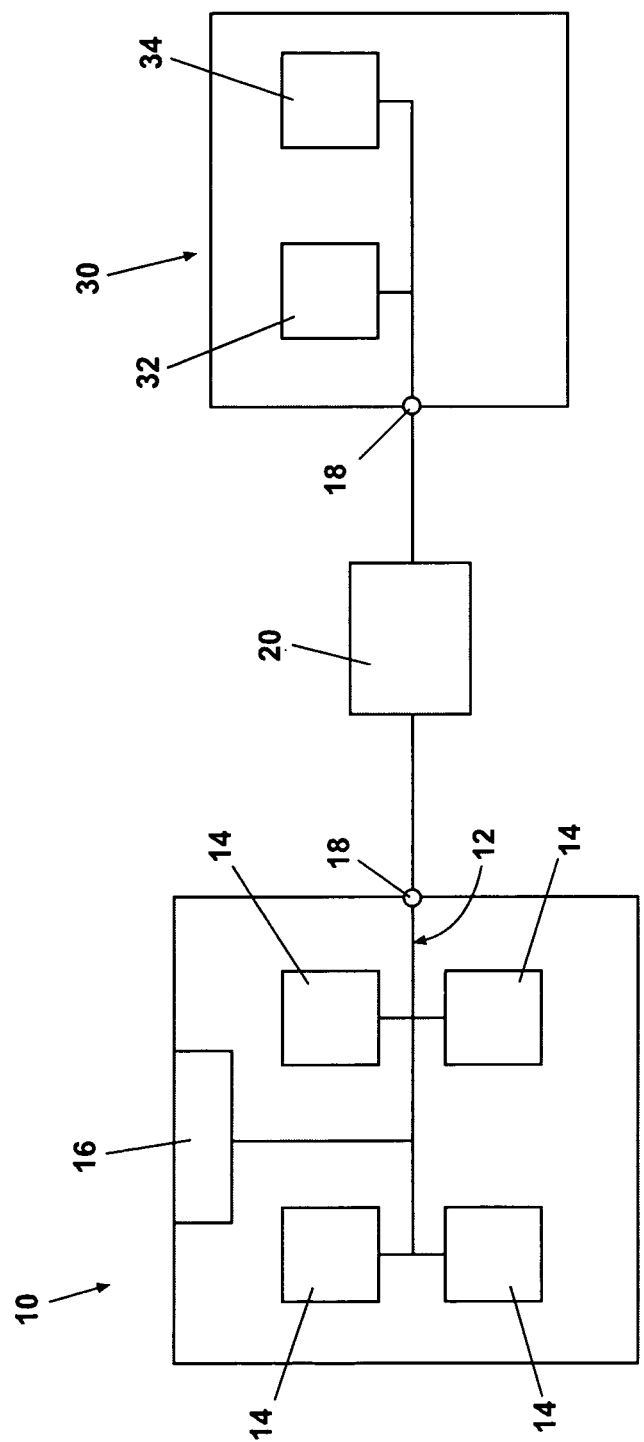
FIG. 1 is a schematic illustration showing a household appliance having an internal communication network connected to a smart device according to the invention.

The invention provides a way to enable a production line product to operate in a demonstration mode, completely controlled from an external device adapted for that purpose. And it does much more as explained below. The invention centers around a smart device connectable to any production product having an internal communications network connecting two or more functional components. The smart device contains demonstration software capable of assuming control of the components in the product and operating them independently of a sales person, but interactively with a potential customer. An example of such a product might be a hybrid automobile with an internal communications network connecting an electric motor with a gasoline engine. The smart device in accord with the invention, can demonstrate features of the automobile inside a showroom in a demonstration mode without having to start the gasoline engine. Another common product type for which the invention can find applicability is in the field of home appliances.

Household appliances typically comprise one or more components which perform the electromechanical operations of the appliance. By employing a software architecture that enables facile communication between internal components of an appliance and between an external component and one or more of the internal components of the appliance, various components and accessories can communicate with the appliance to expand the capability, functionality, and usability of the appliance. The appliance can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The internal components of the appliances can include anything that participates in the operation of the appliance. Examples include a controller (main controller, motor controller, user interface, etc.), which can be a simple microprocessor mounted on a printed circuit board, standing alone or associated with a corresponding device. Other examples include one or more devices such as pumps, motors, heaters, I/O devices and that like that may or may not be controlled by a controller. Typically, the controller components in cooperation either directly or indirectly, through other components, control the operation of all of the components and the associated devices to implement an operation or cycle for the appliance.

The software architecture can be implemented on and communicate over an internal communications network on the appliance. The internal communications network connects the various internal components of the appliance and can be considered a closed network. One example of the internal communications network used within an appliance is the WIDE network protocol, created by Whirlpool Corporation, the assignee of the present patent application.

The software architecture can also expand the communication ability of the appliance by effectively creating an open network. Within the appliance, the software architecture can, but does not have to, reside on each of the components that have a controller. Those components with the software architecture form a network node that can communicate with the other nodes.

The software architecture can perform multiple functions. For example, one function can relate to identifying each of the components corresponding to a node on the network, while another function can relate to identifying capabilities or functions of the identified components on the network. Yet another exemplary function is to identify the status of the components on the network. In this way, the software architecture can function to inform all of the nodes on the network of the presence, capabilities, and status of the other nodes.

The software architecture can comprise multiple modules, each of which has different functionality. Various combinations of the modules or all of the modules can reside on each of the components. One module having a basic or core functionality resides on all of the components. In one anticipated configuration, all of the modules reside at least on the main controller, which establishes the main controller to function as a primary or main software architecture, with the other nodes functioning in a client relationship to the main software architecture. In such a configuration, all of the nodes can communicate through the main software architecture. The software architecture can be sufficiently robust that it can permit configurations without a main software architecture or with multiple main software architectures. For example, the controllers of the various components can work together to control the operation of the appliance without any one of the appliances functioning as a main controller. Regardless of the configuration, any component with the software architecture can function as a client with respect to the other components.

Because of the software architecture, the internal components of the appliance are not only connected with one another, but the internal components can also be connected to one or more external components or a new internal component through the network. The external component and/or the new internal component has one, some, or all of the software architecture modules in resident. As a result, the external component and/or the new internal component can communicate with the internal components of the appliance and can also communicate with other external components having the software architecture.

The software architecture can enable communication between the internal components of the appliance and the external component and/or the new internal component or between components external to the appliance. An example of such a software architecture is disclosed in the parent Application No. PCT/US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, as published at WO2006135726 and incorporated herein by reference in its entirety. All of the communications between internal and external components and/or any combination of components described in this application can be implemented by the software and network structures disclosed in this application.

The software architecture can be implemented by providing one or more of the software elements of the software architecture at least on each of the internal and external components to be controlled. The software architecture is preferably configured to generate a plurality of messages, with at least one of the software elements residing in each of the components and configured to enable transmission of at least one of the plurality of messages between the components. The messages can be transmitted for bi-directional communication between components. The messages can include command messages that are used to implement a physical domestic operation cycle of the appliance.

The messages can be generated by a message generator, which can take the form of the software architecture, an external component, or an internal component. One possible message generator is a user interface. It will thus be apparent that an internal communications network in the product can be formed of the software architecture resident on a single controller, which, in turn, is connected to one or more devices, none of which have its own controller or software. Also, the internal communications network can be formed of multiple devices, any one or more of which may have a separate controller.

FIG. 1 illustrates the invention in the context of a household appliance, designated generally by the numeral 10 in a schematic diagram. The appliance 10 in this embodiment can be any from the group of appliances discussed previously, or any similar product. The appliance 10 preferably includes the previously discussed software architecture having an internal communication network 12 interconnecting a plurality of components 14, wherein each component is capable of communicating with the network 12 by way of the software architecture. The components 14 are conventional and include, for example, motor control microprocessors, key pads, timers, displays, and other devices and controls typically included within the household appliance 10. It is to be understood that the appliance 10 in the context of the invention is a production unit that can be purchased by a customer from a vendor for immediate use without modifications.

The appliance 10 can include a user interface 16 as is commonly used with appliances. The user interface 16 enables a user to actuate and specify the parameters for various operations of the appliance 10. The user interface 16 can include, but is not limited to, any number of well-known features, such as a digital display, speakers, a touch screen, a key pad, buttons, switches, dials, lights, and the like.

The household appliance 10 has an internal/external communications connection 18. The internal/external communications connection 18 can be any suitable connecting device, such as a wire or wireless port, an Ethernet connector, a wireless-G connector, a USB port, a serial port, and the like. The internal/external communications connection 18 is capable of connecting to various network interface devices 20 for enabling communication with various external clients or devices. Examples of suitable external network interface devices 20 comprise any suitable and well-known serial, wireless, infrared, USB and TCP/IP device which would be apparent to one skilled in the art. The connection between the internal/external communications connection 18 and the network interface device 20 can be made permanent or temporary. One external client that can be connected to the appliance 10 via the internal/external communications connection 18 by way of the network interface devices 20 is a smart device 30, according to the invention. The smart device 30 is operably coupled to a network interface device 20.

Figure 2:
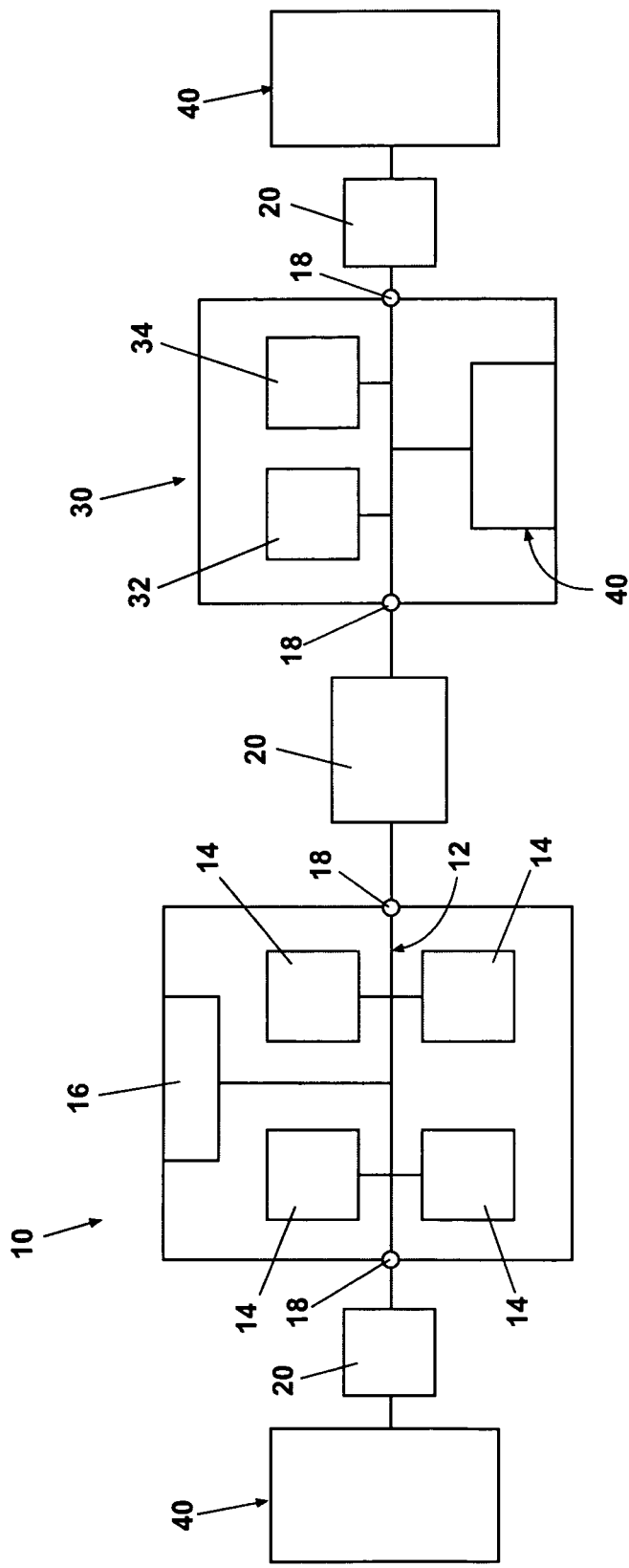
FIG. 2 is a schematic illustration of the household appliance and the connected smart device of FIG. 1 and further incorporating a plurality of connected demo devices.

Referring now also to FIG. 2, the smart device 30 can itself comprise a network interface device 20 for removably coupling to the internal/external communications connection 18 of the appliance 10. The smart device 30 comprises a read-write memory component 32 and a controlling component 34, and can be a dedicated device, or be incorporated in such devices as a laptop computer, remote control, a PDA, a cell phone, or a dongle. The smart device 30 can be powered by any suitable means, such as by an internal battery or from a connection to an outside power source. The smart device 30 can include power transmission means for delivering power to the appliance 10, such as through the communications connection 18. Since, according to the invention, the smart device 30 will control the appliance 10 in a sales demonstration mode, as explained below, it need only deliver enough power to the appliance to effectively operate such a mode. The smart device 30 can also be enabled to connect to other devices (such as the internet) by way of additional internal/external communications connections 18 and other network interface devices 20.

The smart device 30 will have its own software capable of communicating with the internal communication network 12 in the appliance 10. According to the invention, when the smart device 30 is coupled to the appliance 10, the smart device 30 assumes at least some control of the individual components 14 of the appliance 10. For example, the smart device 30 can assume complete control of the appliance 10 and command the appliance 10 to enter a passive state. The smart device 30 can automatically assume control of the appliance 10 upon connection of the smart device 30 to the internal/external communications connection 18. Alternatively, additional stimulation can be required to initiate control of the appliance 10 via the smart device 30, such as by flipping a switch on the smart device 30 or the appliance 10, or by entering a specific key sequence on the user interface 16. Once the smart device 30 has established control of the appliance 10, the smart device 30 can operate the various components 14 of the appliance 10 in a manner different than the components 14 would be operated during normal operation. This unique ability enables the smart device 30 to change the operational capabilities and behavior of the appliance 10 temporarily without requiring any modifications of the appliance 10 or its components 14.

The smart device 30 can use its memory component 32 to store sales demonstration software, for example, hereinafter referred to as "sales demos", which can be accessed by the controlling component 34. The controlling component 34 can communicate with and control the appliance 10 to execute the sales demos. Sales demos can be designed to highlight features of the appliance 10 for the customer and can be interactive with the customer. Exemplary sales demos include, but are not limited to, video presentations, audio presentations, displaying promotions and/or advertisements, light and sound shows, textual displays, 3-D simulations, slideshows, voice feedback, key presses, voice command and control, motion sensing, mechanical system custom demonstrations, and any combination thereof. Sales demos can be updated, deleted, modified, and downloaded to the memory component 32 of the smart device 30. This can be accomplished by connecting a network interface device 20 to an appropriate source (such as the internet) by way of an internal/external communications connection 18 of the smart device 30. Examples of appropriate source include, but are not limited to, a computer, a PDA, a remote control, a cell phone, a dongle, an i-Pod®, the internet, and a USB drive. Sales demos can thus be made adaptable to the needs of different vendors and/or manufacturers by downloading different sales demos and/or modifying or updating existing sales demos accordingly.

As the software architecture enables control of individual components 14 of the appliance 10, the smart device 30 can take advantage of this capability and combine the control of the components 14 with the control of one or more demo devices 40. A demo device 40 can be a device external to the appliance 10 that aids in the presentation of sales demos. The demo devices 40 will be expected to have their operation controlled at least in part by the smart device 30. Examples of such devices include, but are not limited to, a proximity sensor, an LCD display, a speaker, a computer, a touch screen, a keyboard, a monitor, a mechanical device, a light display, a microphone, a camera, a phone, or the like. Demo devices 40 can be completely or partially controlled by the smart device 30. Demo devices 40 can be embedded in the smart device 10. Demo devices 40 can instead comprise a network interface connection 20 and can be connected to either the appliance 10 or to the smart device 30 via an additional internal/external communications connection 18. Each demo device 40 can be enabled with the same software architecture as the appliance 10 whereby the demo device 40 establishes a node on the internal communication network 12 or is part of an existing node on the network 12. If a demo device 40 is not enabled with the same software architecture as the appliance 10, the smart device 30 can optionally serve as a protocol bridge between the demo device 40 and the appliance 10. A protocol is a standard procedure for regulating data transmission between devices; however, not all devices necessarily communicate in the same protocol. A bridge effectively translates one protocol into another so that devices with different protocols can communicate with one another. Thus, the bridge functionality can be incorporated into the smart device 30 and the user does not need to purchase a separate bridge in order for the demo device 40 to communicate across the internal communication network 12.

Figure 3:
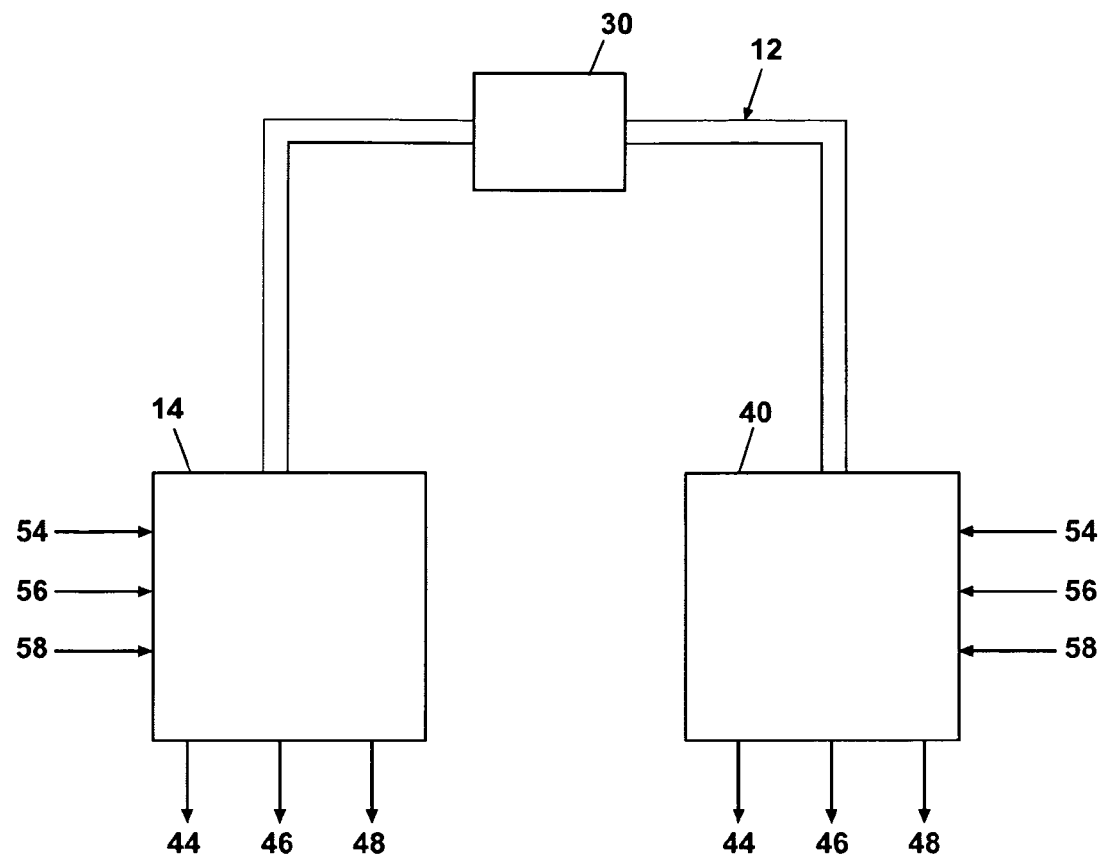
FIG. 3 is a schematic illustration of the smart device of FIG. 1 in use with a component of the appliance and a demo device and showing the capabilities of the component and the demo device.

In order to present the sales demos, the smart device 30 can utilize both the internal components 14 of the appliance 10 and/or demo devices 40, an example of which is illustrated in FIG. 3. An internal component 14 and a demo device 40 can each have visual output 44, audio output 46, and/or sensory output 48 capabilities which can serve a number of purposes, such as encouraging customers to interact with the appliance 10, offering product information and demonstrations, and presenting various promotions and advertisements. The internal component 14 and demo device 40 can also have visual input 54, audio input 56, and/or sensory input 58 capabilities which can serve additional purposes, such as answering customer questions, responding to customer commands, and collecting information regarding the customer and his or her behavior. The internal component 14 and demo device 40 can be controlled to operate passively or to require customer actuation for operation.

Figure 4:
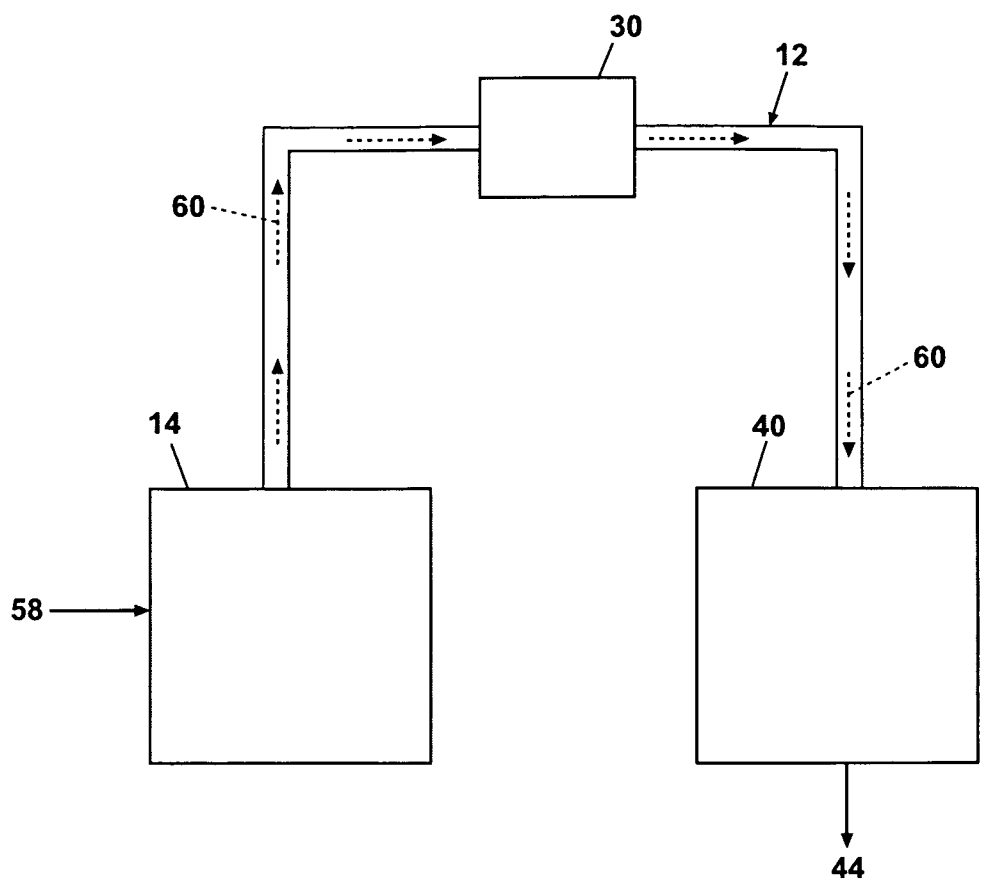
FIG. 4 is a schematic illustration of the smart device, component, and demo device of FIG. 4 and showing communication via messages therebetween.

Referring now to FIG. 4, the smart device 30 can also command the internal component 14 and demo device 40 to work in combination with other internal components 14 and/or demo devices 40. For example, a component 14 or demo device 40 capable of receiving sensory input 58, such as a button or a motion sensor, can send a detailed message 60 across the internal communication network 12 upon receiving sensory input 58 from a customer. A demo device 40 or an internal component 14 having visual output 44 means, such as a light on the appliance 10 or an LCD screen hanging above the appliance 10, can receive the message 60 and provide certain visual output 44 responsive to the sensory input 58. The relationships between components 14 and demo devices 40 and the reactions to messages sent therebetween can be controlled by the smart device 30.

Figure 5:
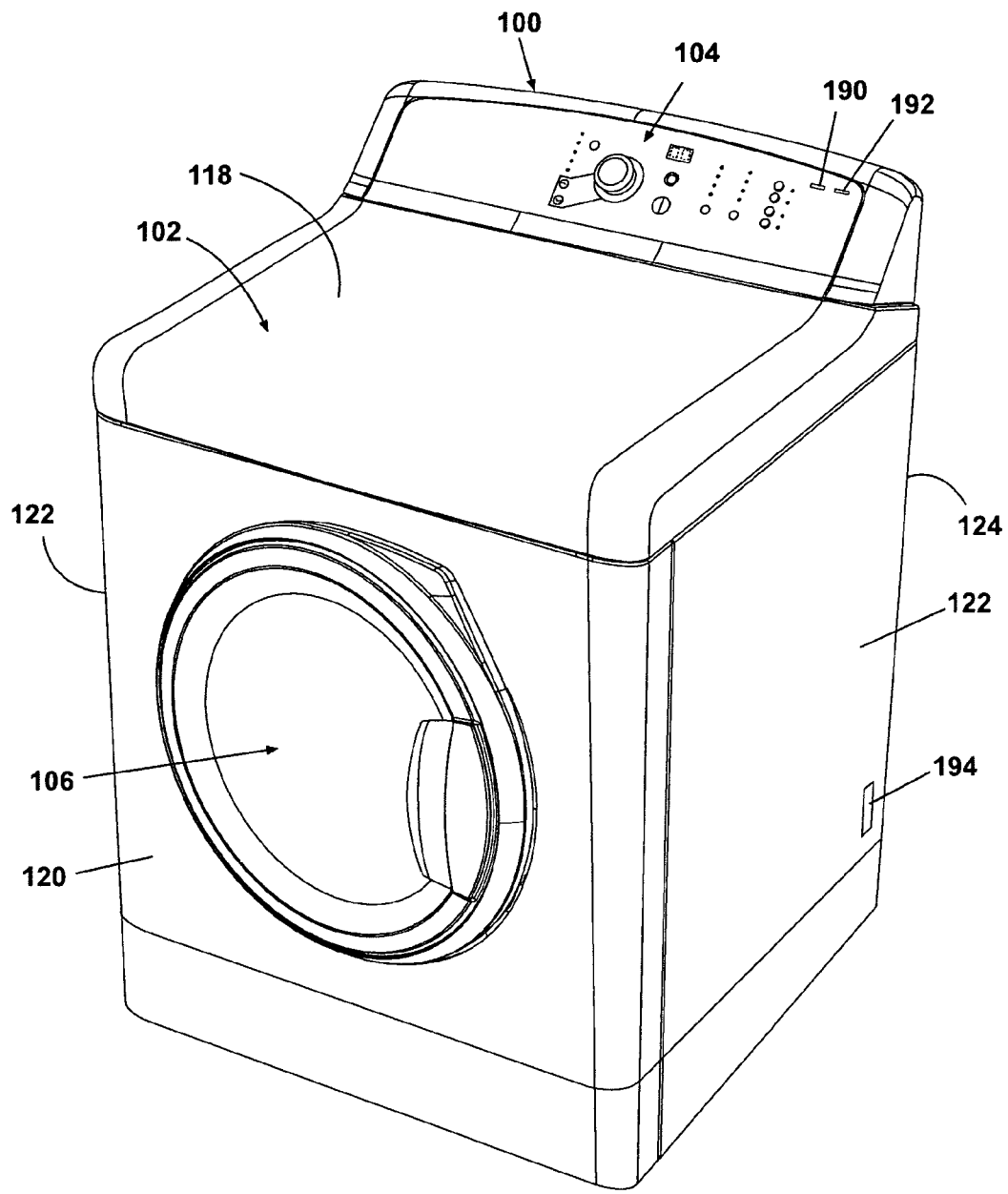
FIG. 5 is a perspective view of a dryer capable of connecting to a smart device according to one embodiment of the invention.
Figure 6:
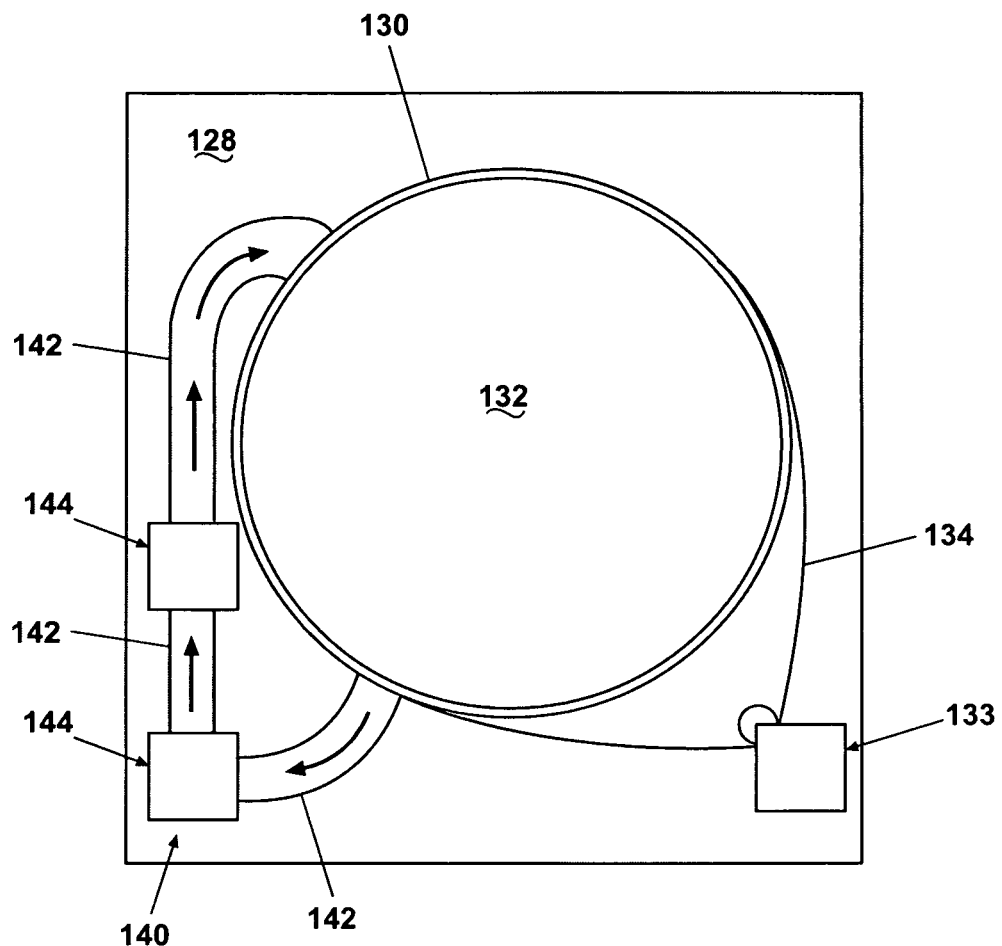
FIG. 6 is a schematic illustration of the interior of the dryer of FIG. 5.

An example of a household appliance according to the invention is illustrated in FIGS. 5 and 6 as a dryer. The clothes dryer 100 described herein shares many features of a well-known automatic clothes dryer, and will not be described in detail except as necessary for a complete understanding of the invention. In this example, the dryer 100 includes a feature wherein the dryer 100 can adjust the pressure in the flow of air to accommodate different load types and different home venting systems. The dryer 100 includes a plurality of elements common to a dryer, such as a cabinet 102 having a user interface 104 for controlling the operation of the dryer 100, a partially translucent door 106 hingedly attached to a front wall 120 of the cabinet 102, a rear wall 124, and a pair of side walls 122 supporting a top wall 118. Two internal/external communications connections in the form of two USB ports 190, 192 are located on the user interface 104. A network adapter 194 is provided for connecting the appliance to a communications network, which may be either a public network, such as the Internet, or a private network.

Looking now more closely at FIG. 6, the interior 128 of the dryer 100 comprises a rotating drum 130 having an open front for access to the interior of the drum 130 which defines a drying chamber 132. The cabinet 102 also encloses a drum motor assembly 133 adapted in a well-known manner for rotating the drum 130 via a drum belt 134. A blower assembly 140, a flexible dryer hose or similar conduit 142, and a heater assembly 144 in fluid connection with one another and the drying chamber 132 are also enclosed by the cabinet 102. An exhaust (not shown) is provided in the rear wall 124 of the dryer 100 for connection to a home venting system (not shown) for venting air.

Figure 7:
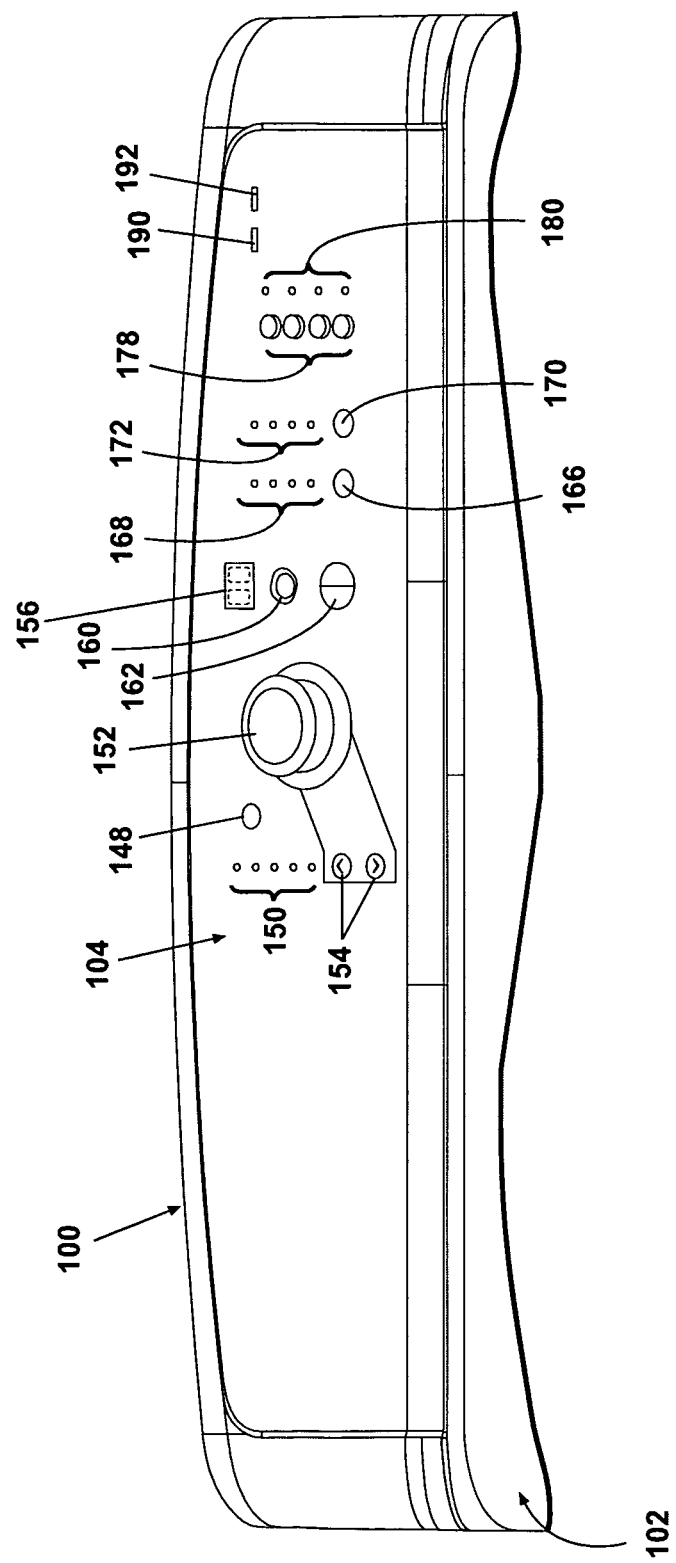
FIG. 7 is a perspective view of a user interface on the dryer of FIG. 5.

In normal operation of the dryer, a user first selects an appropriate drying cycle by means of the user interface 104. FIG. 7 illustrates various features that can be included on the user interface 104, including a power button 148, dryer status indicator lights 150, a dial 152, parameter adjusting buttons 154, a digital display 156, a start button 160, a stop button 162, a first parameter selection button 166, a first set of indicator lights 168, a second parameter selection button 170, and a second set of indicator lights 172, on/off buttons 178, and on/off indicator lights 180. These features can be marked with appropriate indicia to indicate their function. Selecting the drying cycle can require a user to manipulate several of these features to initiate operation and specify common drying cycle parameters. Examples of such parameters include, but are not limited to, cycle type, heat level, dryness level, air level, temperature, and cycle length.

Figure 8:
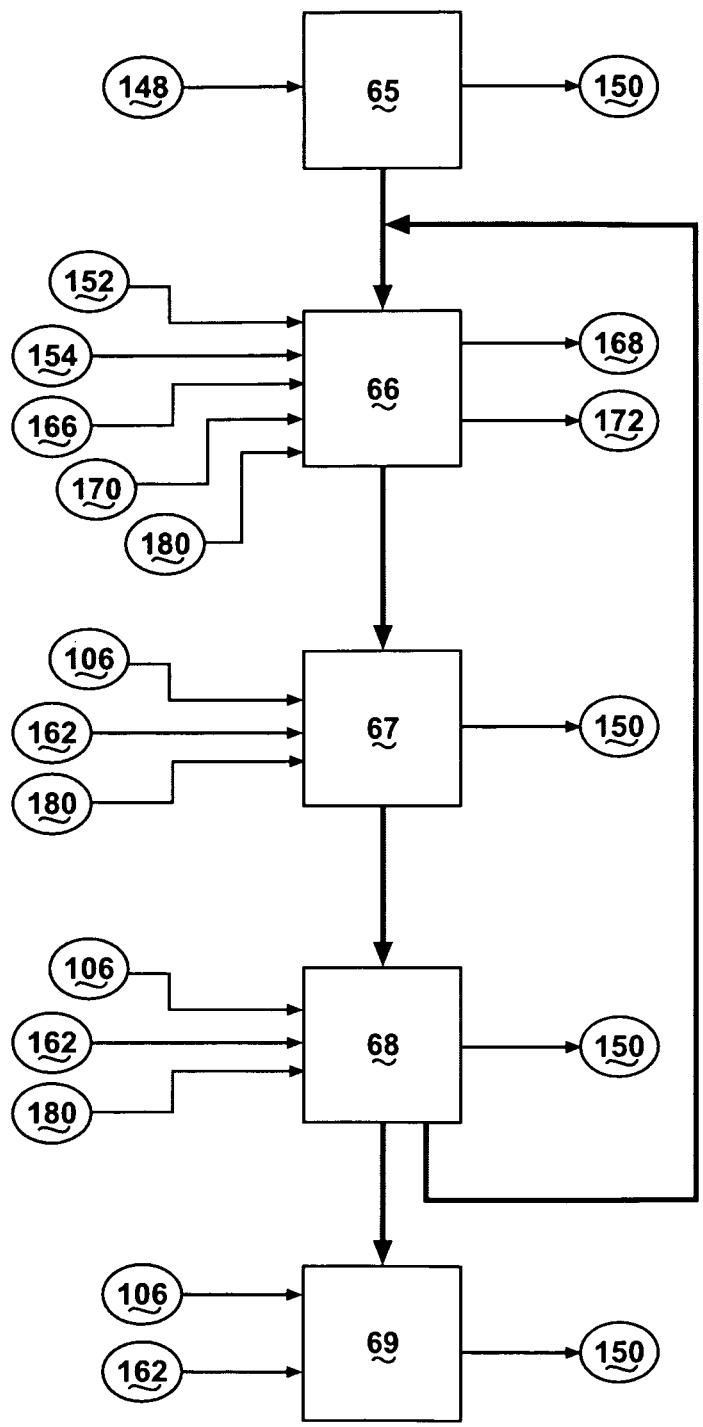
FIG. 8 is a flow chart illustrating normal operation of the dryer of FIG. 5.

For the particular dryer 100 described herein, normal operation of the dryer 100 comprises a number of steps 65, 66, 67, 68, and 69 as illustrated in FIG. 8. Each step is illustrated herein as a box. A feature on the user interface 104 that can be manipulated to effect or affect a given step is illustrated as a circle having an arrow pointing therefrom towards the given step. A feature on the user interface 104 that produces visual output at a given step is illustrated as circle having an arrow pointing thereto from the given step. A first step that must be completed prior to the beginning of a second step is signified by a thickened arrows pointing from the first step towards the second step.

A user powers up the dryer 100 at a power-on step 65 by pressing the power button 148. At least one of the status indicator lights 150 associated with an "on" state of the dryer 100 will become lit upon pressing of the power button 148.

Next, a user can select the drying cycle parameters at a parameter selection step 66. The dial 152 can be rotated to select an appropriate drying cycle type. Examples of specific drying cycles include, but are not limited to, a touch-up cycle, an express dry cycle, a timed dry cycle, a heavy duty cycle, a cotton/towels cycle, a normal cycle, a bulky/bedding cycle, cottons cycle, a delicates cycle, a linens cycle. If the drying cycle type is a timed drying cycle, the user can select a desired cycle length using the parameter adjusting buttons 154 to adjust the number of minutes that the cycle will last. The user can also select a desired dryness level and a drying temperature using the first parameter selection button 166 and the second parameter selection button 170 respectively. The first set of indicator lights 168 and the second set of indicator lights 172 correspond to the first parameter selection button 166 and the second parameter selection button 170 respectively. Each light in each set 168, 172 correspond to a different dryness level and a different temperature level respectively. The buttons 166, 170 can be pressed repeatedly to select the different levels.

Once the parameter selection step 66 is complete, the user can press the start button 160 to begin the drying cycle step 67. As is well-known, the door 106 includes sensing means (not shown) to ensure that the drying cycle will not start if the door 106 is not closed. In accordance with the selected parameters, various components 14 of the dryer will perform a drying cycle. Throughout the drying cycle, the dryer status indicator lights 150 will reflect the operation of the dryer 100. The motor assembly 133 rotates the drum 130 via the belt 134. The blower assembly 140 draws air out of the drying chamber 132 and into a flexible dryer vent hose 142. The blower assembly 140 then circulates the air through a heater assembly 144 to heat the air. The heated air is then propelled through the hose 142 and into the drying chamber 132. Air is vented through the exhaust so as to remove moisture from the drying chamber 132. This cycle continues according the selected parameters. The motor assembly 133, blower assembly 140, and heater assembly 144 can operate at different levels during the drying cycle.

At any time during the cycle, the door 106 can be opened or the stop button 162 can be pressed to initiate a drying cycle end step 68. Once the drying cycle end step 68 has been completed, the dryer 100 can be completely shut off at a power-off step 69 by pressing the power button 148. This will cause the status indicator light 150 that was turned on during the power-on step 65 to turn off. Alternatively, after the drying cycle end step 68, new drying parameters can be entered at the parameter selection step 66. Steps 66, 67, and 68 can be repeated in sequence as many times as desired by a user.

On/off buttons 178 can preferably be pressed at any time during steps 66, 67, and 68 to activate or deactivate additional functions of the dryer 100. On/off indicator lights 180 indicate whether or not the additional functions are activated. Additional functions can include turning on a drum light for enabling easy viewing of the contents of the dryer 100, providing an audible signal to a user when clothes in the dryer 100 are partially dry, extending the drying cycle for additional length of time without heat after completion of the user-specified drying cycle in order to avoid wrinkling, and setting the volume of any audible signals generated by the dryer 100.

Figure 9:
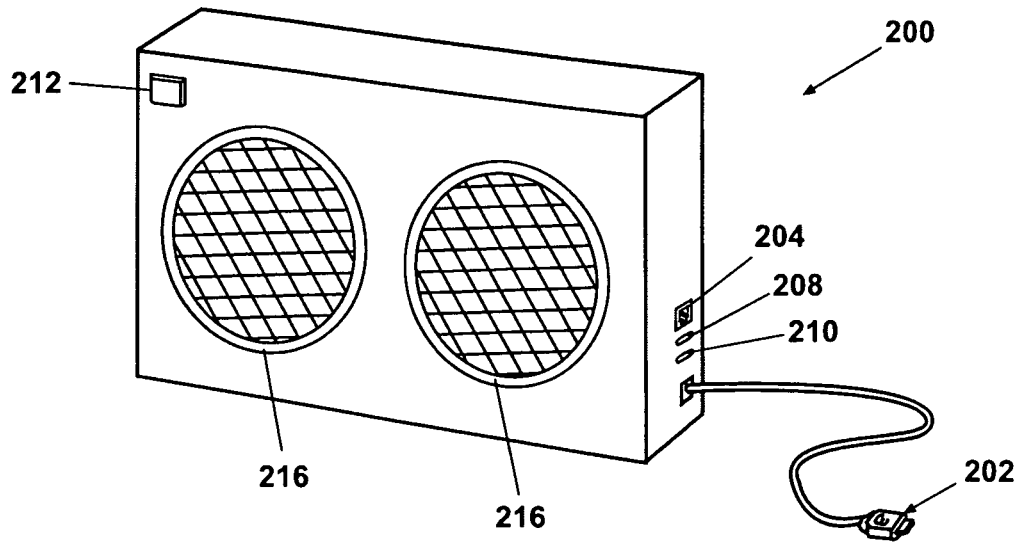
FIG. 9 is a perspective view of a smart device for connection to the dryer of FIG. 5.

In order to demonstrate the dryer 100, according to the invention, a salesperson or other store personnel can provide a smart device 200, such as that shown in FIG. 9. The smart device 200 includes a network interface device in the form of a USB device 202. The USB device 202 is configured to be plugged into the USB port 190 on the user interface 104 of the dryer 100. The smart device 200 also comprises internal/external communications connections in the form of an Ethernet connector 204, two USB ports 208, 210, and a wireless port 212. The smart device 200 includes a rechargeable battery (not shown) that can be charged via USB port 210 by inserting an appropriate charger cord (not shown) into the port. Two speakers 216 for emitting sound are embedded in the smart device 200. The smart device 200 need not be disposed for customer access, but in this particular embodiment, the speakers need to be disposed so they can be heard. In the illustrated embodiment, the smart device 200 is mounted on a wall 218 behind the dryer 100 such that the speakers 216 are facing outward towards the customers.

Figure 10:
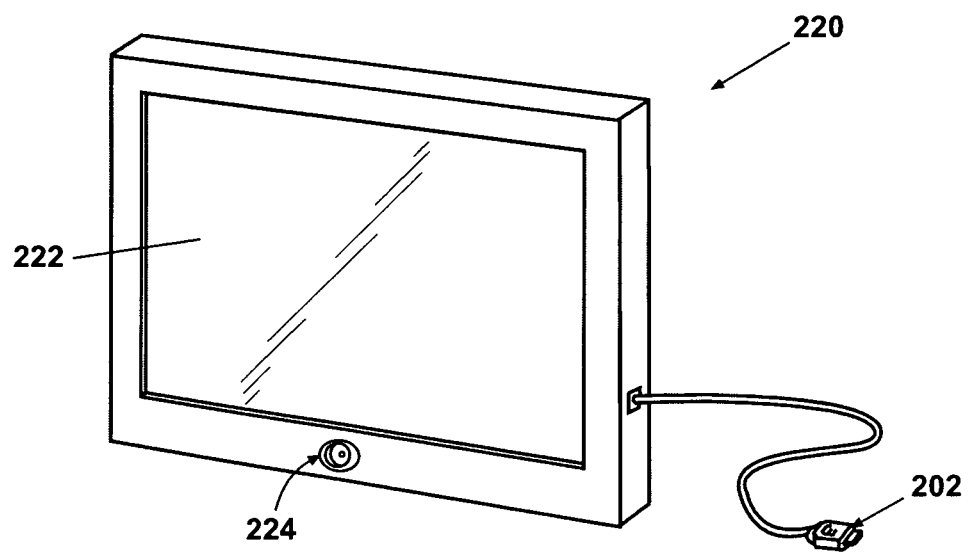
FIG. 10 is a perspective view of an LCD monitor for connection to the smart device of FIG. 9.

Looking now at FIG. 10, a demo device in the form of an LCD monitor 220 includes a USB device configured to be plugged into the USB port 208 of the smart device 200. The LCD monitor 220 is disposed so that it can be seen by a customer. For example, it can rest on the dyer or be mounted to a separate stand or be mounted to a wall if proximate the dryer such as wall 218, etc. The LCD monitor 220 includes a screen 222 capable of displaying video and images. The LCD monitor 220 further comprises a smart camera 224 positioned inconspicuously on a portion thereof and configured to capture images of customers in the vicinity of the dryer 100. The smart camera 224 is able to distinguish between certain types of customers, such as males versus females and children versus adults. This information is available to the smart device 200. The LCD monitor 220 and camera 224 are powered by the smart device 200 via the USB port 208.

Figure 11:
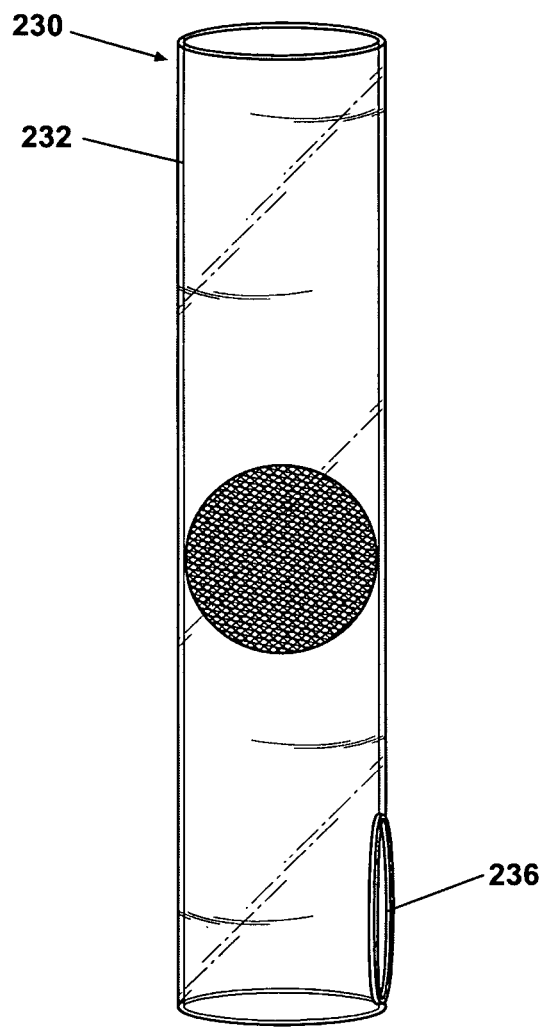
FIG. 11 is a perspective view of an air flow demo unit for connection the dryer of FIG. 5.

Looking now at FIG. 11, a demo device in the form of an air flow demo unit 230 comprises an elongated transparent conduit 232 and a lightweight ball 234 moveably disposed therein. The conduit 232 is removably mounted to the rear of the dryer 100. The conduit 232 is preferably a vertically-oriented hollow cylinder. The conduit 232 is rigid enough and suitably mounted so that it extends for a distance above the dryer 100 without necessitating additional support. The conduit 232 is formed of any material suitable for the purposes described herein, such as a transparent and rigid plastic. The ball 234 is preferably spherical in shape and has a diameter lightly less than the inner diameter of the conduit 232 so that it can freely move vertically therein. The ball 234 is preferably hollow and formed of a low density, low weight substance, such as a plastic. The ball 234 is formed so that it can be seen inside the conduit 232, such as by dyeing the ball 234 in a bright color such as red. A lower end of the conduit 232 comprises an opening 236 configured for connection to and airtight fluid communication with the exhaust of the dryer 100.

Figure 12:
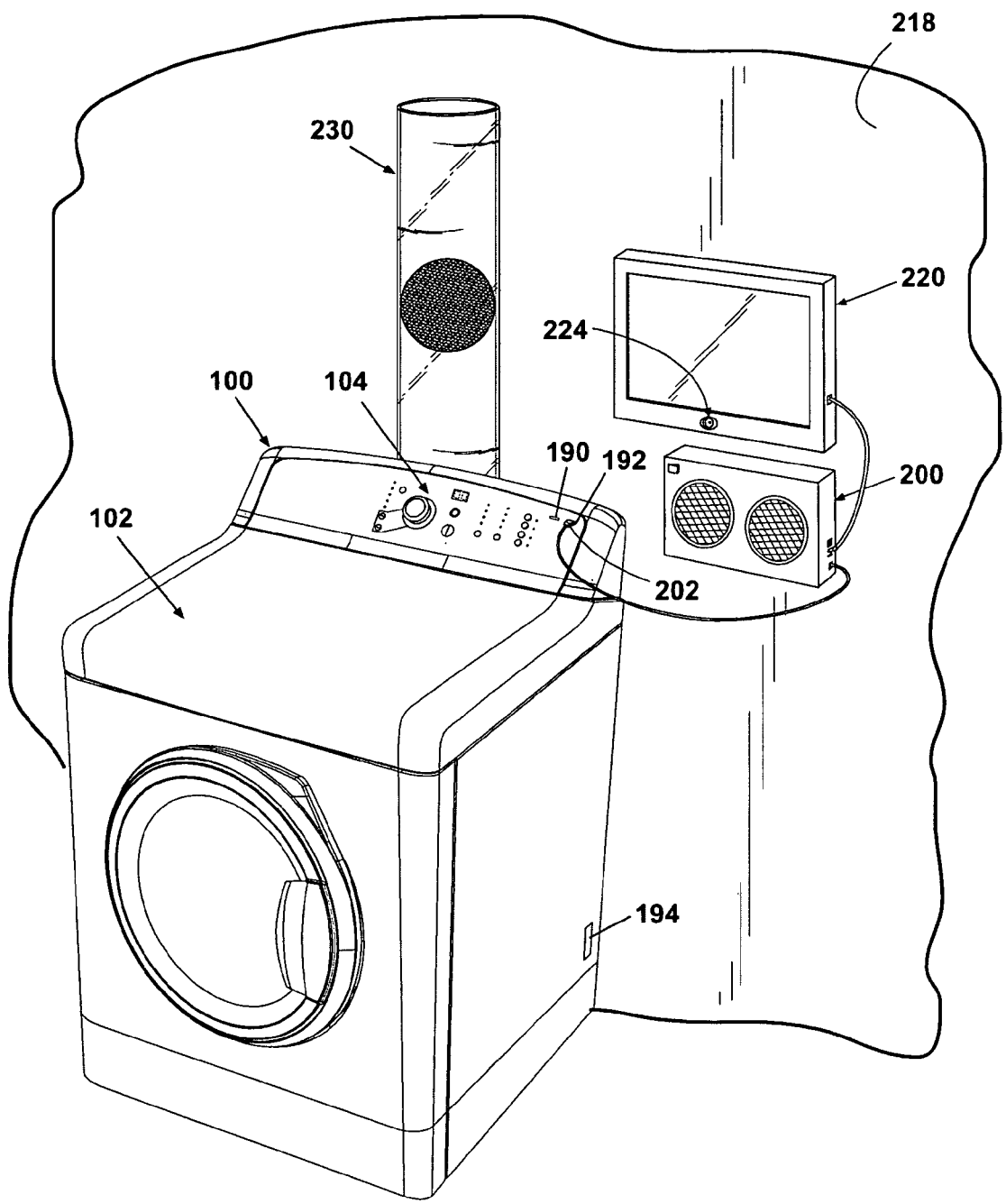
FIG. 12 is a perspective view of the smart device of FIG. 9, the LCD monitor of FIG. 10, and the air flow demo unit of FIG. 11 in use with the dryer of FIG. 5.

The various connections among the appliance 100, the smart device 200, and the demo devices 220, 230 can be seen in FIG. 12. The smart device 200 is connected to the dryer 100 by plugging the USB device 202 into the USB port 192 on the dryer 100. Once the smart device 200 is plugged in 304, the dryer 100 operates in a passive mode, and the smart device 200 assumes complete control of the dryer 100 to present a sales demo 240.

Figure 13:
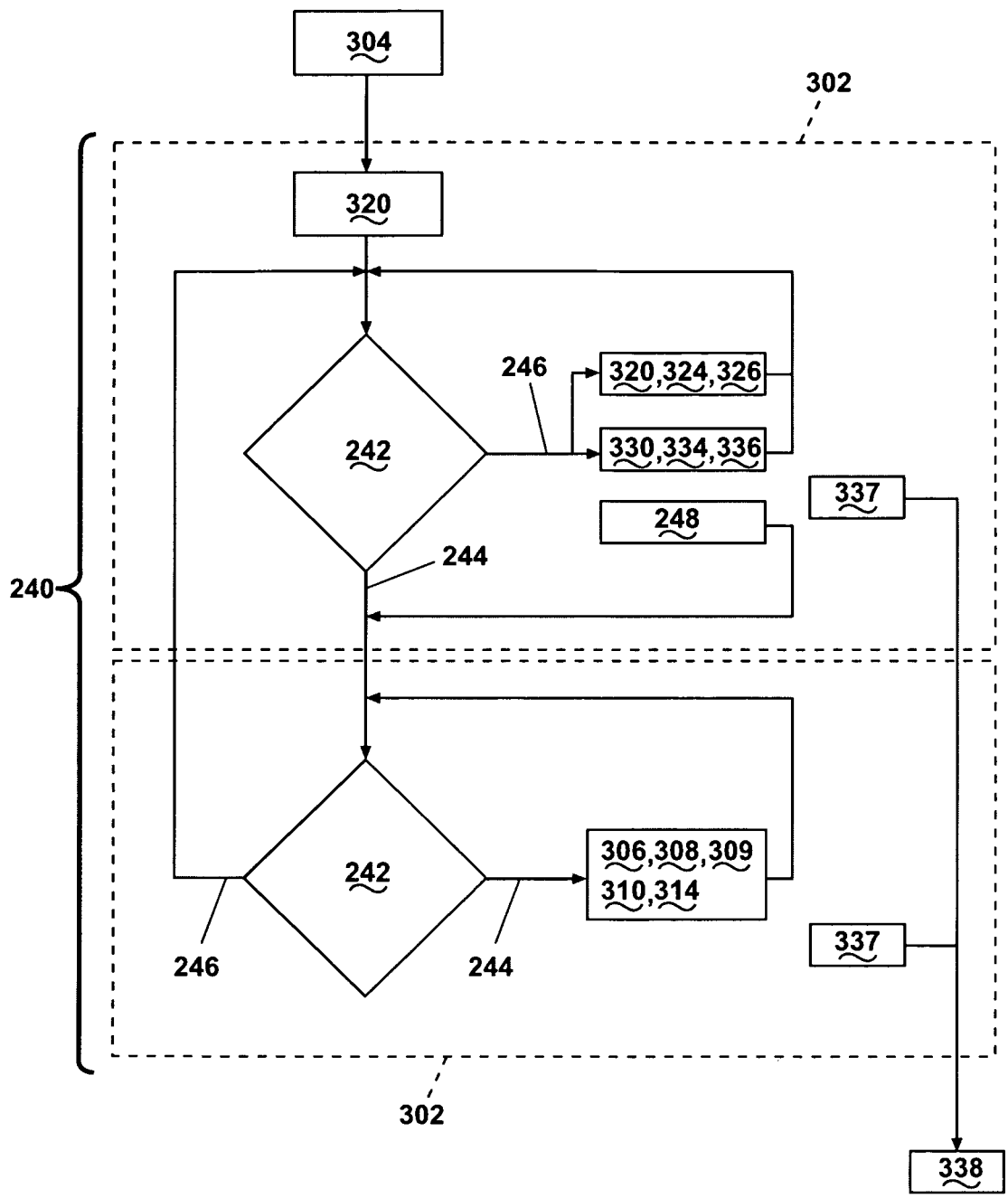
FIG. 13 is a flow chart illustrating a sales demo to be executed and performed by the smart device, LCD monitor, air flow demo unit, and dryer of FIG. 12.

Looking now also at FIG. 13, the smart device 200 automatically powers up the dryer 100 upon being plugged in 304 and begins operation in an active sales demo mode 302, which will be discussed in more detail hereinafter. It is noted that the dryer 100 will be connected to a source of power sufficient to operate the blower 140. That source may be the smart device 200 itself or an independent source. The smart camera 224 and the user interface 104 on the dryer 100 continuously perform a check 243 for the presence 246 of customers throughout the entire sales demo 240. The smart camera 224 continuously searches for customers within a certain distance of the dryer 100. The user interface 104 also waits for and receives any input received from the customer. Customer presence 246 is detected through the manipulation of power button 148, dial 152, parameter adjusting buttons 154, start button 160, stop button 162, first parameter selection button 166, second parameter selection button 170, or on/off buttons 178, or by way of the smart camera 224 detecting a customer in close proximity to the dryer 100

The smart camera 224 can identify certain characteristics of customers using embedded software, such as approximate age and gender. The smart camera 224 can store records of these characteristics. The smart camera 224 can provide this information to the smart device 200 to enable to the smart device 200 to tailor the sales demo 240 to suit a particular customer. An example of such tailoring is targeting male and female customers separately by interchangeably presenting two demos using two different color schemes. One color scheme has been developed to elicit a more positive response from females, and one color scheme has been developed to elicit a more positive response from males. Other examples could include, but are not limited to, using different types of music, using different voices, using different advertising concepts, and highlighting different features.

If no customers are detected 244 within a certain distance of the dryer for a predetermined length of time specified by the sales demo 240, the smart device 200 switches the dryer 100 into a default sales demo mode 300. If a customer presence 246, the smart device 200 will switch the dryer 100 back to the active sales demo mode 302. The default sales mode 300 will also run if a customer presses 248 the stop button 162 at any time during the active mode 302.

In the default sales demo mode 300, the smart device 200 operates the dryer 100 to present a light show 306 using the dryer status indicator lights 150, the first set of indicator lights 168, the second set of indicator lights 172, and the on/off indicator lights 180. The various lights are turned on and off to produce a number of visually-stimulating patterns. The smart device 200 also operates the digital display 156 to output a variety of displays 308 designed to draw the attention of potential customers, such as a greeting or an aesthetically pleasing pattern. The smart device 200 can operate the LCD monitor 220 to display a variety of promotional offers 309, advertisements 310, and the like. One example would be displaying the text, "20% off, today only," accompanied by eye-catching graphics depicting the dryer 100. The smart device 200 can operate the speakers 216 to output an invitational voice clip 314 inviting customers to interact with the dryer 100 as well. An example of such an invitational voice clip 314 could be an inviting phrase reciting "please press any button to learn about our featured dryer".

If the user interface 104 detects that a customer presence 246, the smart device 200 will respond by converting to the active mode 302. The smart device 200 will first output an introductory voice clip 320 through speaker 216. The introductory voice clip 320 will comprise voice instructions inviting the customer to turn the dial 152 or press one of the buttons to learn about each feature of the dryer. The introductory voice clip 320 will also invite the customer to press the start button 160 to learn about the special drying air flow feature of the dryer 100. The introductory voice clip 320 includes instructions informing the customer that the stop button 162 can be pressed at any time to exit the dryer demonstration.

If a customer presses one of the buttons 148, 160, 162, 166, 170, 178, the smart device 200 will output a feature-specific voice clip 322 through the speaker 216. For example, if an on/off button 178 if pressed and the button 178 has indicia indicating it functions to turn a drying chamber light on and off, a feature-specific voice clip 322 could be played that says, "The light feature will allow you to view the contents of the dryer without halting dryer operation." Throughout the active mode 302, the LCD monitor 220 also displays various video clips 324 to support the feature-specific voice clips 322. For example, as the speakers 216 output a voice saying "the light feature will allow you to view the contents of the dryer without halting dryer operation," the LCD monitor 220 will show a video clip 324 of the light turning on and off while a number of clothing items are tumbling about the drying chamber.

In addition, the smart device 200 can operate the various components of the dryer 100 to further the quality of the sales demo 240 by providing a component demonstration 326. The component demonstration 326 can comprise operation of one or more internal components of the dryer 100 in order to demonstrate dryer operation. For example, in conjunction with the light-related feature-specific voice clip 322 and video clips 324 discussed above, the smart device 200 could instruct a component responsible for operating the light in the dryer 100 to switch the light on and off.

If a customer presses the start button 160, the air flow demo unit 230 can be used to present an air flow demo unit demonstration 330. The blower assembly 140 will be operated by the smart device 200 to produce varying rates of air flow in order to demonstrate the dryer's 100 unique air flow feature. The air will flow out the exhaust and into the conduit 232 to cause the ball 234 to move upwardly and downwardly in the conduit 232. The other components of the dryer 100 that would operate during normal operation of the dryer 100 will not be operated, such as the heater assembly 144 and the motor assembly 133. The blower assembly 140 will produce varying air flow rates will cause the ball to hover near the top of the conduit 232, at a point just above the user interface 104 so that a customer can still see the ball 234, and at a point therebetween. As the ball 234 is moved about, an air flow voice clip 334 will be emitted via speakers 216 that will explain the benefits of varying the air flow. The LCD monitor 220 can also display a corresponding air flow video clip 336 of a graph depicting the improved drying ability of the dryer 100 as compared to competitor's dryers. Upon completion of the air flow demo unit demonstration 330, the introductory voice clip 320 can be output by the speakers 216 once again.

The smart device 200 can be disconnected 337 from the dryer 100 at any time to halt operation 338 of the sales demo 240.

Figure 14:
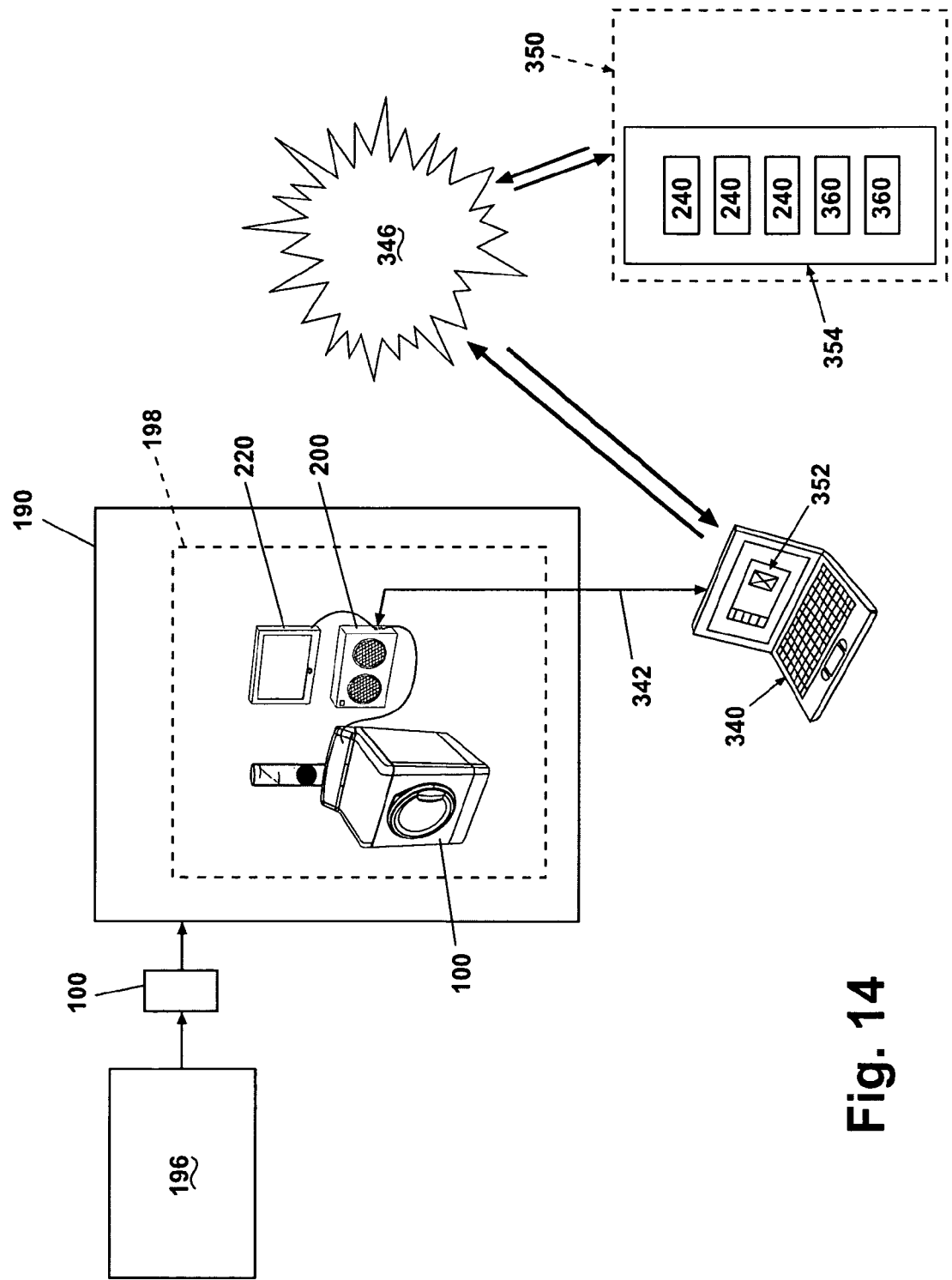
FIG. 14 is a schematic illustration of a business method for use with the invention of FIG. 12.

Looking now also at FIG. 14, a production unit of the dryer 100 having the capability to perform part or all of the aforementioned functions, depending upon model, is shipped by its manufacturer 196 to a vendor 198 for sale. Once at the vendor 198, the dryer 100 is put on display at a desired location where customers can walk about and view the dryer 100. The dryer 100 may be plugged into a power source, enabling it to be operated to the fullest extent of its capabilities, but more commonly, it will not be connected to a conventional power source. Here is where the invention is most useful.

Various sales demos 240 stored in the smart device 200 can be accessed and updated by connecting a computer 340 having a USB device 342 to USB port 210 of the smart device 200. Alternatively, the computer 340 can comprise a wireless device (not shown) and can be connected wirelessly to the smart device 200 via wireless port 212. This is simply a matter of preference and/or availability for each particular vendor 198 displaying the dryer 100. New sales demos 240 and sales demo updates 360 can also be downloaded via the computer 340. Existing sales demos 240 can be updated, modified, or deleted via the computer 340. The computer 340 comprises a connection to the internet 346 enabling access to a website 350. The website 350 is managed by either the manufacturer 196 or the vendor 198. The website 350 comprises a database 354 having a variety of sales demos 240 and/or sales demo updates 360 that can be downloaded to the smart device 200 using a specially-designed downloading program 352 installed on the computer 340. The downloading program 352 software can be downloaded from the website 350. The program 352 provides a simple interface or window serving to guide a user through the downloading process. The program 352 downloads the sales demos 240 to the smart device 200. The program 352 can also enable a user to modify certain characteristics of the sales demo 240. Modifiable characteristics can be designated within the sales demo 240 code.

Figure 15:
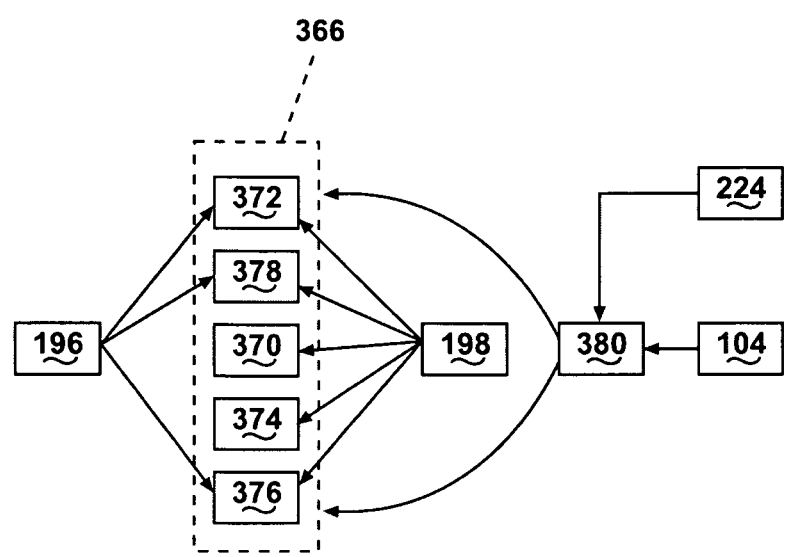
FIG. 15 is a flow chart illustrating the affect of various factors on business concepts for inclusion in the sales demo of FIG. 13.

The sales demos 240 can be downloaded to the smart device 200 and altered as previously described, which enables the vendor 198 to adapt the sales demos 240 to suit current business needs. Different sales demos 240 are available so as to enable vendors 198 to adapt the sales demos 240 for incorporation of a variety of business concepts 366 as shown in FIG. 15.

Business concepts 366 can include targeting regions 370, incorporating advertising campaigns 372, targeting demographics 374, reflecting marketing strategies 376, and/or including current promotions 378. The target region 370 and target demographic 374 are commonly designated by the vendor 198, as manufacturers 196 tend to supply appliances to numerous regions 370 and demographics 374. The advertising campaigns 372, marketing strategies 376, and current promotions 378 can be those of either the manufacturer 196 or the vendor 198. By differentiating the dryer 100 from other dryers on display at the vendor 198, the sales demos 240 can help improve sales of the dryer 100. The sales demos 240 can be customized according to the vendor 198 and trade partners of the manufacturer 196 of the dryer 100. Furthermore, by locating the sales demos 240 on the smart device 200, code for sales demos 240 that would traditionally reside on the dryer 100 can be removed from the dryer 100, thereby reducing development time and cost of the dryer 100. In addition, information gathered and stored by the smart camera 224 and the user interface 104 can be accessed by the manufacturer 196 and/or vendor 198 to generate customer profiles 380.

Customer profiles 380 can then be used to generate advertising campaigns 372, marketing strategies 376, and the like.

It will be apparent from this disclosure that a manufacturer need only make production units of a product and offer them for sale through normal distribution channels. The invention provides a very flexible way to demonstrate the product by enabling a vendor to connect the smart device to a given production unit, install specific demonstration software on the smart device, and operate the smart device to assume control of the product in a demonstration mode. The sales demonstration can thus be targeted to a specific market, for example, geographically or demographically. The demonstration can be tailored to a specific vendor by simple software changes. It can be made fully interactive with a potential customer, and even tailored to the type of customer that the system might be configured to perceive.

Figure 16:
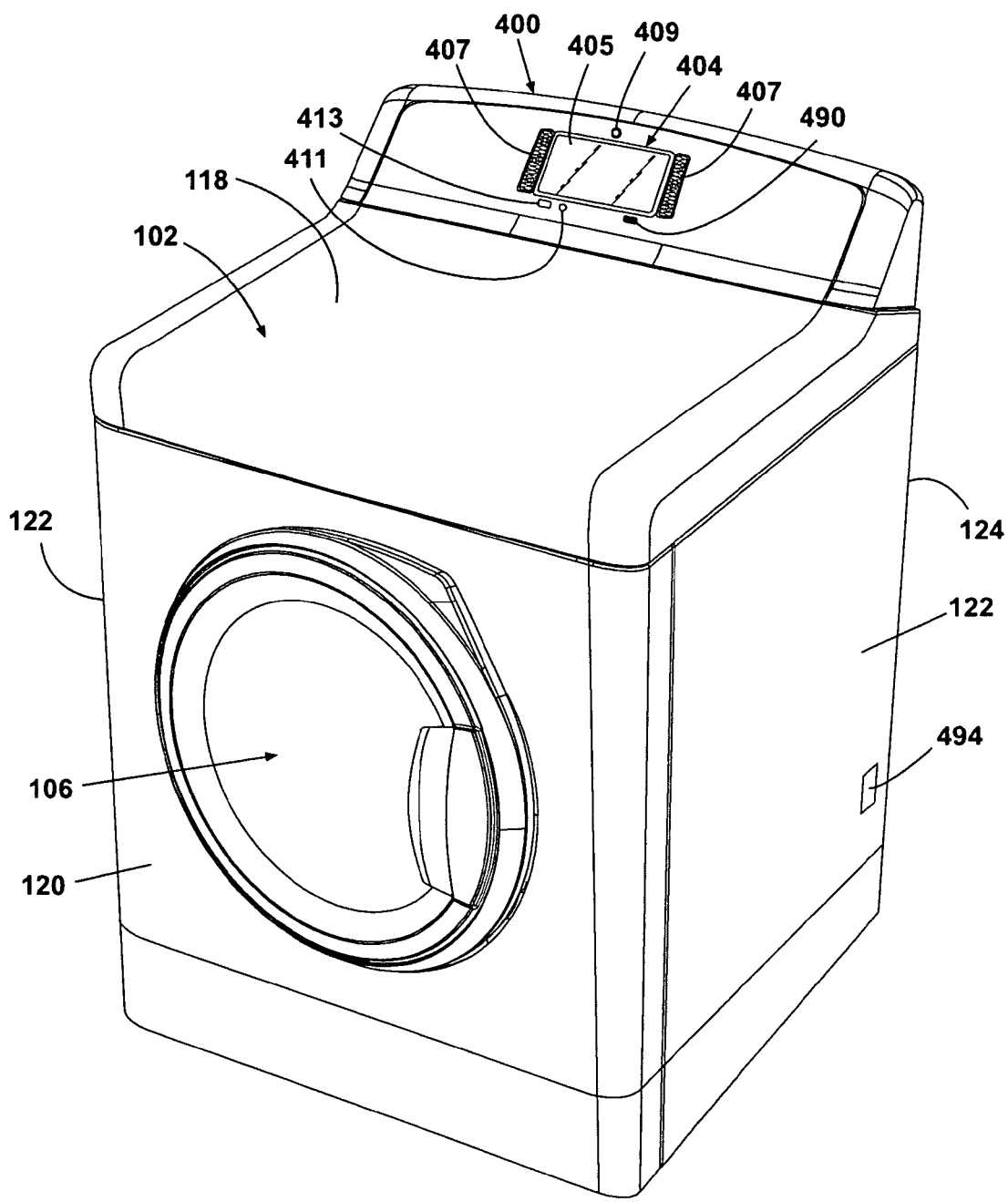
FIG. 16 is a perspective view of a dryer having a multimedia user interface according to another embodiment of the invention.

FIG. 16 is another exemplary appliance according to the invention. FIG. 16 illustrates a dryer 400 that is substantially similar to the dryer 100 of FIG. 5, except that the user interface 104 has been replaced with a multimedia user interface 404 that includes an LCD touch screen display 405, which replaces many of the traditional knobs, buttons, switches, and lights of the user interface 100. Speakers 407 are disposed on opposite sides of the display 405. A camera 409 is located above the display 405. The camera 409 can be an analog or digital video or still camera, or a combination video/still camera capable of taking either video or still images. A microphone 411 is provided along a bottom of the display 405. An audio/video input port 413 is provided for which an audio/video source may be plugged and the video displayed on the display 405 and broadcast on the speakers 407. An audio/video output port 415 is provided for which an audio/video display device may be plugged and the video displayed thereon in addition to the display 405 and broadcast on the speakers 407. A data communications port 490 is provided below the display 405. The communications port 490 can be any suitable type, such as USB or Firewire. A network adapter 494 is provided for connecting the appliance to a communications network, which may be either a public network, such as the Internet, or a private network. The network adapter can be a wired network card or a wireless adapter.

Figure 17:
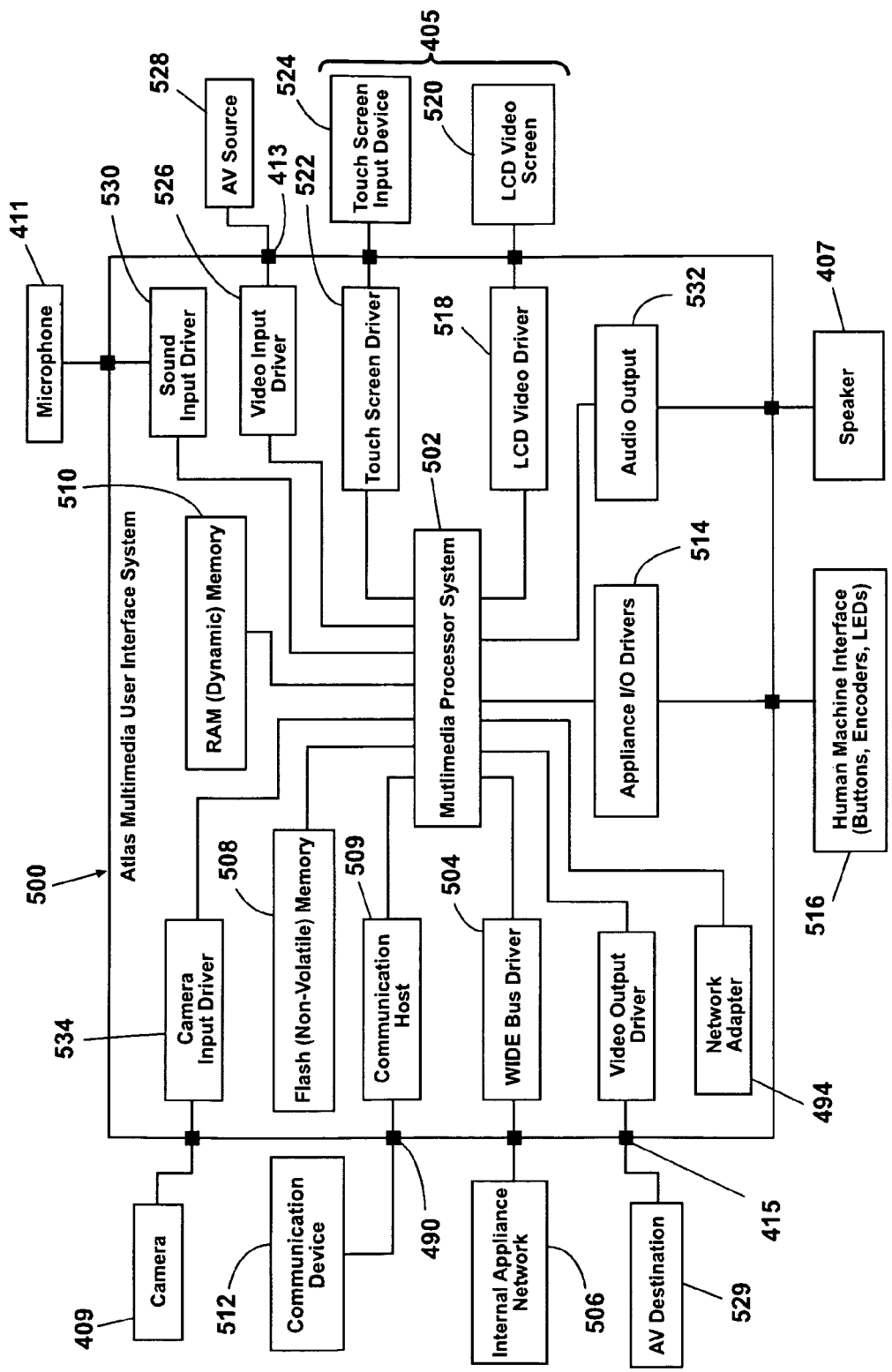
FIG. 17 is a schematic drawing of a controller having an integrated smart device for the dryer of FIG. 16.

FIG. 17 is a schematic of a multimedia controller 500, a part of which forms the smart device for the dryer 400. The multimedia controller 500 can be thought of as the smart device or it can be thought of as incorporating the smart device. Not all of the functionality of the multimedia controller 500 is necessary for performing the smart device functionality.

The multimedia controller 500 comprises a main processor system 502, which is a component to which all of the other components are connected and by which the controller 500 interacts with other components on the internal network of the appliance as well as an external network. For example, the main processor system 502 is coupled to WIDE Bus Driver 504, which establishes external communication with the Internal Appliance Network 506, which includes any other components on the Internal Appliance Network, and expressly includes any other controllers, circuit boards, processors, such as those for the motor and fan of the dryer in the dryer example. In this way, the multimedia controller 500 comprises yet another component on the internal network that is in communication with all of the other components.

The multimedia processor system 502 is coupled to both a non-volatile memory 508 and dynamic memory 510. The non-volatile memory 508 stores the operating software and other executable software for the multimedia user interface 500 along with the demonstration software. In one embodiment, an updatable portion of non-volatile memory holds a relational database enabling information to be dynamically introduced to the appliance by sending one or more SQL statements or the equivalent thereof to the appliance over a network. In yet another embodiment, an updatable portion of non-volatile memory holds an XML file, which can be replaced or modified using a network. The non-volatile memory 508 can be of the type that is completely updatable, such a flash memory. In this way, the demonstration software stored in the non-volatile memory can be updated. The dynamic memory 510 stores applications and data related to the current operations of the multimedia controller 500. All or a portion of the demonstration software stored in the non-volatile memory 508 can be loaded into the dynamic memory upon execution of the demonstration software. The corresponding demonstration can then be updated in real time by new demonstration software, software elements or information in the dynamic memory as part of running the demonstration software. Additionally, service information like test scripts, fault trees, Frequently Asked Questions, user interface screens, video, documents, and the like can reside in memory 508 and 510 allowing for local use by the multimedia processor system 502 such that the consumer may elect to use the multi-media system 502 to attempt a service process before invoking a video conference with a remote agent. Once a video conference is invoked, the remote agent may take control of the multi-media processor system 502 for the service process, or may update the service information over a network, or may assist the consumer to perform the service process.

A communication host 509 couples the communication port 490 to the multimedia processor system 502 and provides for the coupling of a memory or communication device 512 to the multimedia processor system 502. Exemplary types of host include a USB or Firewire host. The device 512 can store the demonstration software or updates to the demonstration software, which can be uploaded to either the dynamic memory 510 or the non-volatile memory 508. The device 512 can also be a device that adds additional functionality, like a network adapter. For example, there are wireless network adapters that connect via a USB connection.

The multimedia processor system 502 is also coupled to an Appliance I/O Drivers component 514, which is coupled to a Human/Machine Interface component 516, which includes any other input/output devices and related elements such as buttons, encoders, lights, etc.

An LCD video driver component 518 couples the multimedia processor system 502 to an LCD display 520 forming part of the LCD touch screen display 405. The video driver 518 controls the display of images on the LCD display 520. A touch screen driver component 522 couples the multimedia processor system to a touch screen input device 524 of the display 405. The touch screen input device can be a membrane that overlies the LCD display and determines the location of a contact with the screen. Such membranes can work in many different ways. Some are pressure sensitive and some are based on a change in capacitance.

A video input driver 526 couples the audio/video input port 413 to the multimedia processor system 502. An external audio/video source 528 can be coupled to the video input port 413 and its video signal is delivered to the multimedia processor system 502 via the video input driver 526. In this way, an external video device can be coupled to the appliance and its video displayed on the display 405.

An external audio/video device 529 connected to the audio/video output port 415 couples to the multimedia processor 502 through a video output drive 531 such that audio or video generated by the multimedia user interface can be displayed on the device 529.

A sound input driver component 530 couples the microphone 411 to the multimedia processor system 502 to provide sound within range of the microphone, especially the voice of a consumer in front of the appliance, to be transferred to the multimedia processor system 502.

An audio output component 532 couples the multimedia processor system 502 to the speakers 407. In that way, sound generated by a program, such as the demonstration program, can be broadcast on the speakers. Similarly, sound from the audio/video source can also be broadcast on the speakers. Sound from the microphone can also be broadcast on the speakers.

A camera input driver component 534 couples the camera 409 to the multimedia processor system. Images, video or still, from the camera will be sent to the multimedia process system 502 via the camera input driver 534. The multimedia process or can display the video on the display 405.

The multimedia processor system 502 in addition to displaying or broadcasting any of the audio/video on the display 405 and the speakers 407 can send the audio/video over the network adapter 494 for use by other appliances or devices. Similarly, the multimedia processor system 502 can receive audio/video over the network adapter from another appliance or device for display and broadcast on the display 405 and the speakers 407. The multimedia processor system 502 is capable of sending or receiving streaming audio/video over a network via the network adapter.

When the demonstration is to be performed on the appliance 400 with the multimedia user interface 404, the demonstration software is executed. The demonstration software takes over control of the appliance and begins two primary functions. The first is demonstrating one or more of the components of the appliance. The second is running a multimedia presentation on the multimedia user interface 500. The multimedia presentation can generally track or explain the demonstration of the components. It can also supplement the demonstration of the components and add media that goes beyond the mere demonstration of the components. The presentation will comprise any combination of visual and audio information, which can include any combination of video, still images, and sound.

The demonstration software can be stored in the non-volatile memory 510 and loaded as required to the dynamic memory 510 during execution of the program. It is anticipated that in most cases the demonstration instructions for the components and the presentation can be stored in the non-volatile memory 508 as a standard demonstration software. As the demonstration software is updated, the updated version can be downloaded and saved in the non-volatile memory via the network adapter. It is also contemplated that the demonstration software can be updated in real time as the demonstration software is being executed.

In the embodiment of FIG. 17, the multimedia processor system 502 and the non-nonvolatile memory 508 loaded with the demonstration software in combination with the display 405 and/or speakers 407 collectively form the smart device.

Figure 18:
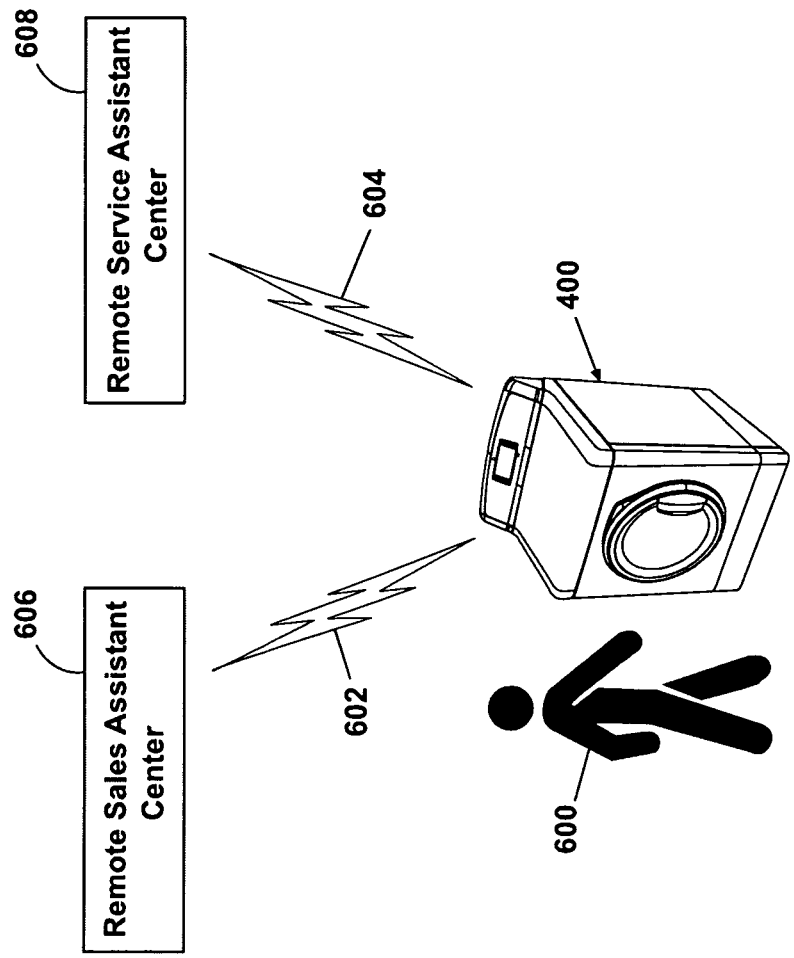
FIG. 18 is a schematic drawing of a network connection between the dryer of FIG. 16 and remote third parties.

The ability of the multimedia user interface 500 to send or receive audio/video over a network enables some useful functionality for the appliance, especially during the execution of the demonstration software. FIG. 18 illustrates one possible implementation of the multimedia user interface 500 in the context of a demonstration of the appliance, which can be used to illustrate the variety of functionality that can be obtained by incorporating the smart device with the multimedia user interface 500. FIG. 18 illustrates a consumer 600 positioned in front of the appliance 400 having the multimedia user interface 500. The multimedia user interface 500 is coupled via the network adapter 494 over networks 602, 604 to a remote sales assistant center 606 and a remote service assistant center 608, respectively.

Various elements of the multimedia user interface 500 can be used to determine or sense the presence of the consumer 600 in front the appliance. For example, the camera 409 and microphone 411 can be used to detect or sense the presence of the consumer 600. The camera 409 can continuously or at intervals send images to the multimedia processor system 502 that can monitor the images for a change. When the change in the image is indicative of the presence of the human, the multimedia processor system 502 can make the determination that a human is present and start the execution of the demonstration software. There are many known software applications that can be used to process still or video images to determine if a person enters the view of the camera. This type of software can be loaded into the non-volatile memory 508 and run by the multimedia processor system 502 to determine the presence of the consumer.

In a similar manner, the microphone can send signals to the multimedia processor system 502, which can run a suitable software for determine if the sensed sound is indicative of the presence of a consumer 600 in front of the appliance 400. The determination can vary from very simple recognition, any sound different from the background sound, to more complex voice recognition, where the multimedia processor system not only looks for words or phrases that would indicate human presence, but also try and determine what is said. Again, there are many known software applications that can process sound in this manner. Such software can be stored in the non-volatile memory 508 and run by the multimedia processor system 502.

An additional benefit of the voice recognition is that it can also be used to determine the native language of the consumer 600. Once it is determined the language spoken by the consumer 600, this information can be passed to the demonstration software and the demonstration software can display all text in the native language of the consumer and all broadcast audio can be in the native language of the consumer. If the appropriate native language graphic and audio files are not stored in either the non-volatile memory 508 or dynamic memory 510, the appropriate files can be downloaded from the remote sales assistant center 606 or some other suitably accessible location and then stored in the dynamic memory for use in the sales demonstration and the displaying of the related multimedia presentation on the display 405.

In addition to determining the presence of a consumer 600, the multimedia user interface 500 can also be used to identify, uniquely or generally, the consumer 600 and this information can be used to customize the demonstration for the consumer 600. The identification can be done passively and/or actively. For example, a passive identification can be accomplished by using the camera 409 or microphone 411 to sense characteristics of the consumer 600 that can be used to identify the consumer. The camera 409 can capture an image, video or still, of the user and then analyze the image for identification. The image could be of a biometric of the user, such as a face scan, fingerprint, retinal scan, which can then be compared to a database, remote or local, for a match to uniquely identify the consumer. The microphone can capture a voice print of the user and similarly look for a match in the database.

In addition to biometric information, other information regarding the consumer can be determined from just an image and a voice file when processed by the appropriate software.

Such information includes, but is not limited to, gender, age, height, mass, voice, facial expression, native language, eye color, and hair color. This information is generally not sufficient to uniquely identify a consumer, but it can be used to generally or categorically determine a consumer as belonging to a particular demographic.

The consumer identification can also include active identification. An example of active identification includes the demonstration software prompting the consumer for personal information, which can include, but is not limited to, name, address, age, identification number, credit card information, financial information, etc. The consumer 600 can enter the information via the touch screen 405 or by voice recognition using the microphone in response to prompts by the demonstration software.

Regardless of whether the consumer information is collected passively or actively and whether the consumer information is uniquely identify or generally identifying or a combination of both, the network adapter enables the multimedia user interface to connect to a remote consumer database containing such consumer information, which can be maintained at the remote sales assistant center 606 or similar location. The database can include a profile for a uniquely identified consumer 600. Information of the consumer 600 obtained during the demonstration can be added to the profile. If the consumer does not exist in the database, the biometric information can also be added as a new consumer and a profile can be started. The database can contain similar information for a generally or categorically identified consumer and a corresponding demographic profile.

Once the consumer 600 has been identified, uniquely or generally, the demonstration can be customized for the consumer 600. The customization can be done by selecting from demonstration instructions and presentation elements already stored in the multimedia user interface 500 or it can be downloaded from a remote location, including the previously discussed consumer database. The amount and type of customization is limited only by creativity and technology, but can include, without limitation, sales incentives, appliance recommendations, related-appliance recommendations, appliance accessories, appliance options, and appliance build options. For example, if the consumer is uniquely identified and his/her profile includes currently owned appliances, recommendations for new appliances can be made. Additionally, options of the currently owned appliances can be recommended on the appliance 400. A completely different or complementary appliance can also be recommended. The sales incentives can include price discounts, price bundles, financing options, etc.

The customization of the demonstration is anticipated to be done in real time, but it can be done by downloading an update to the standard demonstration software. The update can be thought of as a consumer-specific update regardless of whether the consumer is uniquely or generally identified. It is also possible for the entire demonstration to be downloaded to the appliance. For purposes of this application, the term downloading expressly includes streaming audio/video information.

The consumer information collected during the demonstration can be transferred to another appliance. The transfer can be direct in a peer-to-peer relationship or via a common database like the consumer database. As the appliance 400 has a network adapter 494, which can be wired or wireless, the appliance 400 can connect to other similarly configured appliances and transfer the information. An anticipated scenario where the information would be transferred is in the context of the sale of complementary appliances, such as a washer and dryer. If the consumer 600 is receiving a demonstration on one of the two complementary appliances, the consumer can be prompted to view the other complementary appliance, which can already be customized for the consumer 600. The other of the complementary appliance can even solicit the consumer 600 to the extent the appliance can identify the consumer 600. For example, if the name of the consumer 600 is known, the complementary appliance can use the speakers to 407 to call out the name of the consumer 600 to direct them to the complementary appliance. A more general solicitation, such as "Please look at me" or other similar wording, can also be used.

Another beneficial function of the multimedia user interface 500 includes being able to conduct a video conference using the display 405, camera 409, and microphone 411. One anticipated use includes providing a video conference link between a sales representative at the remote sales assistant center and the consumer 600. The sales representative can interact with the consumer 600. The interaction can be in the nature of a conversation where the sales representative can answer questions for the consumer 600. The sales person can also run the demonstration software in a manual mode where they sales person directs the sales demonstration, including the demonstration of the various components.

The sales representative can use the video conferencing to complete the sale of the appliance 400 to the consumer 600, including the collection of all personal information, financing, and delivery. The video conferencing can also be used to conference in other parties, such as the financial representative, delivery representative, and installers, without limitation. All of this information can be added to the profile for the consumer 600 in the consumer database.

Once the consumer has the product delivered to his/her home, the video conferencing functionality can be used to video conference with a remote service assistant center 608 where a representative, such as a technician, can assist the consumer 600 in installing, servicing, and using the appliance.

In the context of installing or servicing a product such as an appliance in accord with the invention, it will be appreciated that the product will most likely be in a location, such as a home, to be operated by a consumer 600 (now a user), remote from a service center fully capable of servicing the product. Preferably, the product or appliance 400 will have at least one serviceable component coupled to and controlled by a controller 500 having a multimedia user interface 404 to implement a cycle of operation, and, if more than one component, with an internal appliance network 506 coupling the components to the controller. The product will also be connected to a smart device 30, 200 as disclosed above, where the smart device has video conferencing functionality or the product has such functionality controllable by the smart device. Preferably, the smart device will be coupled to the product components 14 or to the internal appliance network 506, and it will have software capable of assuming control of the user interface 404 and/or the product components 14. The multimedia controller 500 can be thought of as the smart device or it can be thought of as incorporating the smart device. Not all of the multimedia functionality of the multimedia controller is necessary for performing the smart device functionality.

The installation or servicing process commences by establishing a video conference link between the user 600 and a service representative. Controller 500 is coupled to the remote service assistance center 608 over network 604 via the network adapter 512. The smart device or the product itself may be provided with a user interface component that upon actuation will establish a video connection to a service representative. As described above, the smart device may be incorporated with the multimedia controller 500 which is provided with a user interface 404 that enables a user 600 to initiate contact with the service representative, as for example, by selecting a user interface component that will initiate a video conferencing link. User interface components include both physical components like push buttons, membrane switches, selector switches and the like and virtual components like a touch screen button on a graphical user interface or like a voice command which could be received by microphone 411, digitized by the sound input driver 530, and processed by processing system 502. Alternatively, it is contemplated that in a system where remote monitoring of the product is maintained, contact can be initiated by the service representative when the monitoring system is first brought on-line or it identifies a potential problem with the product. If the user 600 is not immediately available or not responsive, the service representative can leave a message at the product, or by another means, requesting a user response.

It will be understood that establishing a video conferencing link will likely include data, video and/or audio links among the product, the user 600, and the service representative. The service representative will be able to view data from the product and communicate data to the product simultaneously with maintaining a video and audio connection with the user. Information in the form of data, video and or audio can travel multi-directionally between the product, the user, and the service representative. The information can be exchanged in real-time or stored and sent at the request of the user or the service representative.

The service representative can use the video conferencing link and the data connection to put the appliance into a service mode and run diagnostics software, at user request and/or allowance. Since the multimedia controller 500 is provided with both a non-volatile memory 508 and dynamic memory 510, the diagnostic software can be stored in the non-volatile memory 508 and uploaded into the dynamic memory 510 upon execution of the diagnostic software. The diagnostic software can then be updated in real time by new diagnostic software or information in the dynamic memory 510 as part of a real-time diagnostic. This software is preferably able to read the model and serial number of the product 400, read any fault codes that are in memory, identify componentry and functionalities, obtain a recall history of the model number and prior history of the particular product serial number, confirm the product's firmware, firmware and software upgrades, product status, etc. One advantage of collecting this data automatically via a data link is that it minimizes the likelihood of manual error and enables more convenience for the user who does not have to gather such information, some of which is difficult to locate.

It is contemplated that when the appliance is first installed, the service representative can guide the user through the installation and set-up of the appliance. This can include verbal instructions through speakers 407 or in combination with images or text displayed on the LCD touch screen display 405. The user can communicate with the service representative through microphone 411 or by using the LCD touch screen 405. Installation tutorial programs can be preprogrammed into the appliance prior to delivery and stored in either the non-volatile memory 508 or the dynamic memory 510. The service representative can upload the programs to the dynamic memory 510 from the non-volatile memory 508 at the time of installation or upload programs over the network 604. The installation instructions and tutorial programs can be interactive, prompting the user to press an icon on the LCD touch screen display 405 when they are ready to go to the next step in the installation process, for example.

Once the installation process is complete, the service representative 608 can remotely, over network 604, run the product through some basic diagnostic tests, such as running one or more cycles, checking each control board through a series of verification tests like activating each actuator and checking for the expected responses, sensor checks, usage history, and availability of resources such as gas, water, and electricity. Expected responses from activating actuators include expected power consumption, expected sensor readings, expected user interface responses like prompts, screen changes, messages, image changes, changes to console lighting, vibrations, noise, expected network messages, and mechanical movement. The ability to conduct diagnostic tests of the various components of the product is provided by the multimedia controller 500 which is coupled to the internal appliance network 506, and is therefore in communication with any other components on the internal appliance network. These diagnostic tests can be used to determine if the product has been installed properly and can also be used during a service call. The service representative can communicate the results of an individual test or a series of tests to the user through the LCD touch screen display 405 or the speakers 407. For example, when installing a clothes washing machine, it may be necessary to make sure the machine is level before using it. The service representative can monitor the data received from a level sensor built into the appliance to determine if the machine has been properly installed and leveled before use. Alternatively, the data can be analyzed by a program, pre-loaded into the appliance or uploaded by the service representative, who compares the data received from the appliance to pre-determined values or ranges of values and then communicates to the user whether or not the values received from the appliance are within the range of acceptable values for operation. Communication means can include an audio message delivered through speakers 407 stating that the test was completed successfully or images or text on the LCD touch screen display 405 to that effect. The service representative can also run the diagnostic tests during a service call. The service representative receives data from the appliance during the diagnostic tests that allows the service representative to determine if a component is functioning appropriately or if it needs to be repaired or replaced. Other diagnostics can include user input and monitoring how the user is interacting with the product 400.

In cases where safety is a concern or the user requires assistance in using the appliance, the service representative could instruct the user to initiate certain steps, confirm that these steps are being executed as expected in real time, and then observe the results. For example, the user can be asked to clear a drum in a dryer or a cabinet in a microwave and then close the door, or the user can ensure that there is water in a reservoir before starting a heating element. Typically, safety measures will avoid an unattended product start. An alternative is if the system is equipped with software architecture as described in the incorporated and referenced document WO2006135726 where the product can be placed into an alternate mode of operation so that the service representative can perform a cycle of operation in the product as if it were being operated physically in real time. For example, the components in a dryer can be caused to behave as if the drum were rotating, when in reality it is not. In this way, by running diagnostics that isolate a component or a group of components, when a service visit is required this software can identify which component or components are faulty and instruct the service person so that only one trip is required to fully service the appliance 400. The service person can bring the data to the location (download of the diagnostics received from the service representative) and otherwise have access to the same data and history, and run the same test to confirm the solution on site. In a situation where it is not clear whether the appliance is malfunctioning or if the user is not using the appliance as intended, the service representative can ask the user to repeat the steps to reproduce the problem and monitor the user's actions in real time. One way to monitor user's actions is through the use of camera 409. Another way to monitor user actions is though voice acknowledgments captured by microphone 411. Yet another way to monitor user actions is through logging network messages that hold information about key presses or user interface events. Yet another way is to use the data acquisition engine in the incorporated WO2006135726, which can be configured to monitor a plurality of memory locations within the controller of the appliance and create network messages in response to changed values in the memory locations in response to the changed values and in response to the configuration. In this way, the service representative can monitor the use of the product and take that information into consideration when diagnosing a problem. The service representative can also lock the controls of the appliance if he or she believes the appliance is not being used as intended. Moreover, since a significant number of service visits are attributable to the consumer's knowledge of how to appropriately use the product, the remote service assistant can provide customer assistance both verbally and visually thereby eliminating many visits from a service representative.

It is also imagined that this software could modify appliance parameters remotely or upload new versions of the appliance software. The service representative can monitor parameters remotely and adjust them if necessary to keep the appliance operating as it was intended to. For example, the service representative can monitor the drying time of a clothes dryer and remotely adjust the temperature of the heating element to minimize drying time. The service representative can also upload software to the appliance to update the appliance software to the most recent version or upload software fixes for the current version. The software can be uploaded to either the non-volatile memory 508 or the dynamic memory 510.

In addition to assisting the user during installation and servicing, the diagnostic software can assist the user in the daily use and maintenance of the appliance. The appliance can display to the user operational parameters that the user can adjust, either directly or indirectly, on the LCD touch screen display 405. Additionally, the software can suggest settings or cycles to the user based on conditions that are measurable by components within the appliance. Data from a component within the appliance is sent to the microprocessor controller 502 over the internal appliance network 506. This data can then be displayed to the user through a settings program via the LCD touch screen display 405 and the user can make adjustments accordingly. Additionally, the data can be communicated to the user through the human machine interface 516 via the appliance I/O drivers 514 and adjusted as desired through the human machine interface 516. For example, the user can monitor the temperature of a freezer unit and adjust the temperature based on the items in the freezer. Another example would be that a clothes washer could alert the user that the washer is overloaded. The alert can be audible through speakers 407 or visible on the LCD touch screen display 405.

The appliance can also alert the user when maintenance is required or suggested. The alert can be initiated by the service representative or the appliance software. For example, the appliance can remind the user to defrost the freezer on a pre-determined schedule. The appliance can also run a maintenance test, similar to the diagnostic tests previously described, initiated on a predetermined schedule or by the user or service representative. The maintenance test can determine if components are functioning properly and suggest appropriate steps to the user if they are not. For example, the maintenance test could determine that the dryer vent is clogged and suggest that the user remove any debris that is present. The maintenance test can also notify the service representative if a faulty or broken component is identified or the service representative can assess the results of the maintenance test for himself or herself. For example, if the results of the maintenance test suggest that the air circulation unit in a refrigerator is not operating as expected, the data can be sent to the service representative for review. The service representative can review the data and remotely initiate additional diagnostic tests or alert the user that there may be a problem. The service representative can contact the user through the video conferencing link in the appliance or through other means, such as by telephone.

It should be noted that the video conferencing need not include both video and audio. While it is more desirable to have both video and audio, the video conferencing can be just audio, much like a telephone call. Additional video conferencing means include connecting an external laptop computer device to the smart device of the product through communication host 509. Communication host 509 can be a USB or Firewire host, for example. Communication with the service representative can then take place through the computer by audio, visual or text means. Appropriate software can be uploaded from the smart device to the computer for running diagnostic or maintenance tests and viewing data. The laptop computer can essentially function as the user interface for multimedia controller 500 if one is not integrated with the appliance. It is also contemplated that during a service visit, the service personnel can interact with the appliance by connecting a computer and communicating with the appliance in much the same way the service representative can remotely.

Figure 19:
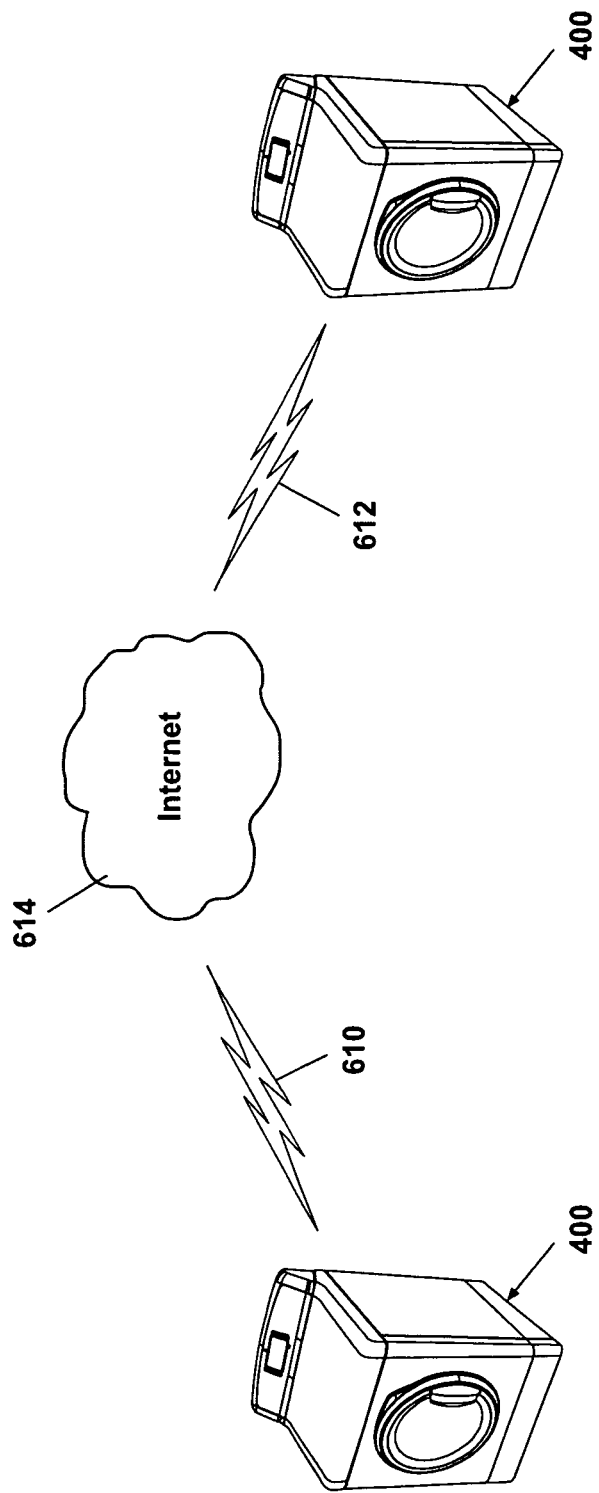
FIG. 19 is a schematic drawing of two dryers of FIG. 16 in communication over a communication network.

FIG. 19 illustrates another implementation of the appliance 400. In this example, two appliances 400 are coupled to each other over communication networks 610 and 612, which are coupled via the Internet 614. In this configuration, the video conferencing functionality of the appliances 400 can enable videoconferencing between the consumers of the respective appliances 400. This use can be done at the sales room or once the consumer has the appliance in their home. Thus, it will be possible for consumers to use the appliances for a video conference, which can be done independently of or in conjunction with the use of the appliance.

While only two appliances 400 are shown in FIG. 19, several appliances can be joined in a video conference. It is also not necessary for the appliances 400 to connect over the Internet. The appliance 400 can be connected via the same network 610 or similarly connected networks.

While the video conferencing functionality is described in the context of the appliance 400 with the multimedia user interface 500 with the integrated smart device, it should be noted that the video conferencing functionally can be implemented using a non-integrated smart device as long as the non-integrated smart device contains the hardware and software for implementing a video conference. One example of such a suitable smart device is a cell phone as previously described and which incorporates a video camera.

Figure 20:
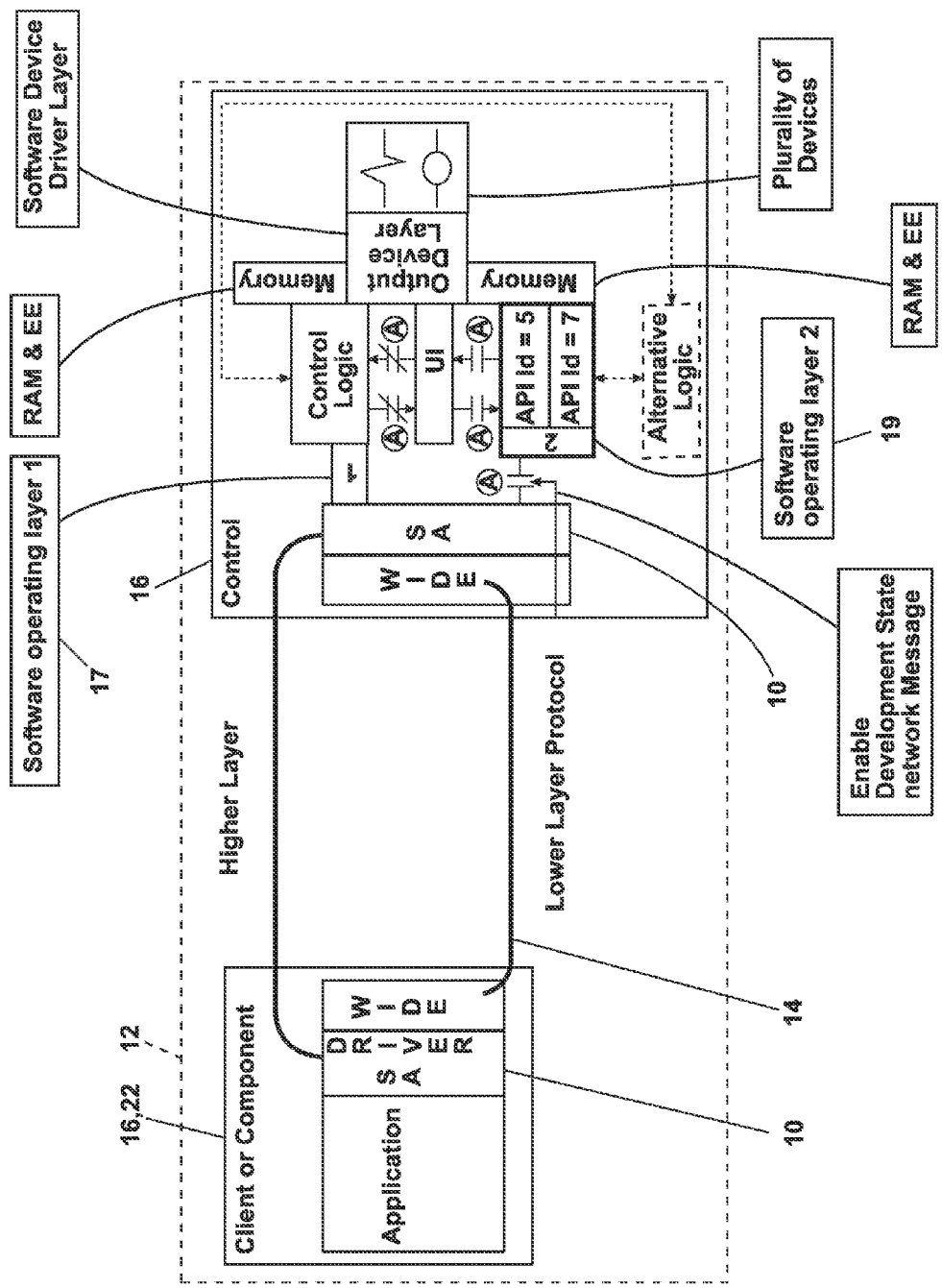
FIG. 20 is a schematic illustration of the internal communication network of FIG. 1.

FIG. 20 is a schematic illustration of the internal communications network 12 of FIG. 1 showing typical appliance control components 14 exchanging messages via the internal communications network 12 of the household appliance 10 comprised of a lower layer protocol, WIDE being an example thereof, which accounts for OSI layers of PHY, LINK, and partial Network layer functionality and a higher layer protocol supported by the software architecture (which accounts for OSI layers of Application, Transport, and partial Network layer functionality) according to the invention. The lower layer protocol functions as both a physical and link layer between the higher layer associated with the software architecture and the components 14 in the appliance. In this way, the software architecture uses the lower layer protocol to communicate with a first software operating layer 17 that implements the control logic of the controller 16 relative to client 22, as well as using a second software layer 19 to bypass the control logic and directly control the devices associated with the control 16. The devices in FIG. 20 are the physical elements that represent the functionality of the control component 16. FIG. 20 illustrates the control architecture from a software/protocol stack perspective.

In addition, FIG. 20 provides a schematic illustration of two modes of operation enabled by the software architecture which control the access to and the level of intervention between the network messages exposed by the software architecture and the internal RAM and EE and other forms of non-volatile memory of 16A as well as the Output Device Layer, which is a low level software operating layer 16B residing within 16A and providing direct control of the devices electrically connect to the component. The Output Device Layer 16B having direct control of the devices do so by having direct access to the micro-processor port address memory, which, in turn, maps to the physical pins of the micro-processor which, in turn, are connected through various electronic apparatus to the electro-mechanical devices.

Software Operating Layer I of FIG. 20 represents appliance specific software components 16B which interface the network messages received by software architecture to the Application Control Logic resulting in the Application Control Logic to take some action. When the appliance is in a Development State (switch labeled A in FIG. 20), an additional Software Operating Layer 2 (comprised of API 5 (low level API) and API 7 (the memory/Port API) and their implementations and Alternate Logic) enable the network messages of API 5 and API 7 to change the state of the physical memory of 16A and the devices. In this way, the devices and memory can be controlled independently of the application software, which typically controls the devices and memory in accordance with an operational cycle of Software Operating Layer I. This direct control permits the each function of the devices to be independently controlled, which is very beneficial in development or diagnostic processes.

Software Operating Layer 2 is enabled to effect state change by a special network message exposed by software architecture and also additional logic which is customized for the various states of the appliance. During development state, it is preferred that when the user interacts with the appliance via the user interface of FIG. 20, software operating layer I will not receive the associated user interface inputs. Instead, software operating layer 2 will receive the inputs from the user interface. Subsequently, software operating layer I may interact with the Alternate Logic of FIG. 20. The Alternate Logic may in turn make function calls onto the Control Logic of Software Operating Layer I, change values in memory, or change the state of the attached plurality of devices. However, during development state Software Operating Layer I is not able to effect the state of the user interface (LEDs, lamps, buzzers, text and graphic displays, etc.). Development State renders the Control Logic of Software Operating Layer I ineffective unless invoked from Software Operating Layer 2. During Development State, the implementation logic of API 5 and 7 and the Alternate Logic are in complete control of the Appliance 12 and its associated componentry.

Development State reverts back to the Idle State when a special network message is received. In addition, it is contemplated, that at least one pre-determined key press of a sequence of key presses may also result in a transition from Development to Idle state.

Software Operating Layer I operates independently of the enablement of Operating Layer 2. The purpose of the development state is to allow and enable operational cycles that were not previously contemplated. The advantage to this approach is that implementations and configurations of the appliance do not require new software modifications to any component 14 of the appliance because the appliance has the capability through the software architecture 10 to support any implementation or configuration contemplated.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

We claim:

1. A method of servicing an appliance configured to perform a cycle of operation on a physical article, and having a processor with control logic in communication with at least one observable component in the appliance to effect the cycle of operation by way of a first software operating layer in a first operating state and an alternate logic for communication with the at least one observable component in the appliance by way of a second software operating layer in a second operating state, and a software architecture that enables communication with the at least one observable component over a network external to the appliance, and wherein the network includes a multimedia controller with a first user interface, the method comprising:

establishing an audio-video conference link via the multimedia controller between a service representative and a user of the appliance to enable interaction between the service representative via a second user interface and the user via the first user interface;

establishing two way communication between the at least one observable component and the service representative over the network via the software architecture wherein the control logic of the first software operating layer is rendered ineffective unless invoked by way of the second software operating layer;

communicating information between the user and the service representative via the audio-video conference link;

selecting by the service representative a diagnostic test having at least one command message and expected results;

transmitting the at least one command message over the network to the at least one observable component;

executing the at least one command message by way of the second software operating layer in the second operating state either by way of the second software operating layer operating the control logic of the first software operating layer or by way of the alternate logic of the second software operating layer and directly commanding the at least one observable component in the second operating state independently of the first software operating layer;

observing on the second user interface any state change in the at least one observable component based on the execution of the at least one command message; and comparing the expected results to the observation.

2. The method of claim 1 further comprising the step of collecting data about the at least one component.

3. The method of claim 1 wherein the audio-video conference link includes at least one of a still picture of the service representative, a video of the service representative, a voice signal from the service representative, a voice signal from the user, a still picture of the user, a video of a user, an audible signal from the appliance, a still picture of the appliance, and a video of the appliance.

4. The method of claim 1 wherein the communicating information includes one of answering questions, asking questions, explaining to the user how to use the appliance, assisting the user in a service process, assisting the user in an installation or configuration of the appliance, ordering a replacement part, authorizing a replacement part order, purchasing a good or service, and authorizing the purchase of a good or service.

5. The method of claim 1 wherein the service representative controls the at least one component by sending one of a network message to the at least one observable component and a test script to be run on the at least one observable component.

6. The method of claim 5 wherein the test script is contained in one of an XML document, a database record, and SQL statements for appending and updating records in a database.

7. The method of claim 1 wherein the appliance comprises multiple observable components and the service representative selects which of the multiple observable components to activate as part of the service.

8. The method of claim 1 wherein the service representative sends information to the user over the multimedia controller.

9. The method of claim 8 where the information is one of a fault tree or portion thereof, a how-to video, a use and care guide, a frequently ask questions document, a still picture, an image, a survey, a question, an SQL statement, an XML document, and a URL.

10. The method of claim 1 further comprising coupling a smart device having the multimedia controller to the network.

11. The method of claim 10 wherein the service representative controls the at least one observable component.

12. The method of claim 11 wherein the user controls the at least one observable component using the smart device.

13. The method of claim 11 wherein the appliance comprises multiple observable components and the service representative selects which of the multiple observable components to activate.

14. The method of claim 11 wherein the smart device is used for one of the service representative sending information to the user, the user sending information to the service representative, the at least one observable component sending information to the service representative, and the at least one observable component receiving information from the service representative.

* * * * *